United States Patent
Sills et al.

(10) Patent No.: US 6,690,746 B1
(45) Date of Patent: Feb. 10, 2004

(54) SIGNAL RECOGNIZER FOR COMMUNICATIONS SIGNALS

(75) Inventors: James A. Sills, San Antonio, TX (US); Q. Robert Black, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 542 days.

(21) Appl. No.: 09/591,014

(22) Filed: Jun. 9, 2000

Related U.S. Application Data

(60) Provisional application No. 60/138,866, filed on Jun. 11, 1999.

(51) Int. Cl.[7] .............................................. H04L 9/00
(52) U.S. Cl. ..................................................... 375/316
(58) Field of Search ................................. 375/316, 350, 375/323, 279, 261, 272

(56) References Cited

U.S. PATENT DOCUMENTS 5,499,399 A * 3/1996 Bond et al. .................. 455/296
5,563,917 A * 10/1996 Sheynblat .................... 375/346
6,122,309 A * 9/2000 Bergstrom et al. ........... 375/130

* cited by examiner

Primary Examiner—Khai Tran
(74) Attorney, Agent, or Firm—Baker Botts L.L.P.

(57) ABSTRACT

A signal recognizer capable of classifying any of all commonly used communications signals. The recognizer has a number of modules that may operate in parallel, each module associated with a different signal type. Each module determines signal parameters by first estimating one or more parameters of a detected signal of interest. The estimated parameter(s) is then used as the basis for demodulating the input signal. The demodulated symbols are used for hypothesis testing, during which the module decides on a candidate signal type for that module. Each module subjects its candidate signal type to a "false alarm" test, which evaluates the likelihood that the signal is not the signal type associated with the module. The resulting confidence data is collected and analyzed to determine a best candidate signal type from among all the modules, together with its signal parameters.

39 Claims, 20 Drawing Sheets

SIGNAL RECOGNIZER FOR COMMUNICATIONS SIGNALS

RELATED PATENT APPLICATION

This application claims the benefit of U.S. Provisional Application No. 60/138,866, filed Jun. 11, 1999 and entitled "Signal Recognizer for Communications Signals".

TECHNICAL FIELD OF THE INVENTION

This invention relates to telecommunications, and more particularly to a signal recognizer that receives a signal of unknown type and determines its signal parameters.

BACKGROUND OF THE INVENTION

Signal demodulation assumes that certain signal parameters, such as modulation type, are known. Thus, conventional signal demodulation is achieved with some sort of hardware device, designed to receive a particular type of signal. The demodulator operates only on the type of signal it is designed to receive. For example, an FM demodulator operates on FM signals, and must be tuned to a frequency appropriate for an incoming signal.

Identification of signals of an unknown type has evolved independently of demodulation techniques. Examples of applications of signal identification include direction finding confirmation, monitoring, spectrum management, interference identification, and electronic surveillance. Various techniques have been developed for "automatic signal recognition", which seeks to identify the modulation type (along with various parameters such as baud rate) of a detected signal for the purpose of signal exploitation. For example, a signal recognizer can be used to extract signal information useful for choosing a suitable counter measure, such as jamming.

Interest in modulation identification algorithms has increased with the emergence of new communication technologies. In particular, there is growing interest in algorithms that recognize quadrature amplitude modulated (QAM) signals, which are used in the HF, VHF, and UHF bands for a wide variety of applications including FAX, modem, and digital cellular.

Many techniques for modulation recognition have been published in the literature. In early work, frequency-domain parameters were used to distinguish between six candidate modulation types. This work was published in a report by Weaver, Cole, Krumland, and Miller entitled *The Automatic Classification of Modulation Types by Pattern Recognition*, Stanford Electronics Laboratories, Technical Report No. 1829-2, April 1969. A well-known paper treating digital modulation types presents results based on a statistical analysis of various signal parameters to discriminate between amplitude shift keying (ASK), FSK, and PSK. F. F. Liedtke, "Computer Simulation of an Automatic Classification Procedure for Digitally Modulated Communications Signals with Unknown Parameters", *Signal Processing*, Vol. 6, pp. 311–23, 1984. In general, the parameter-based approaches were directed to detectable parameters of the signal, such as its envelope or phase.

Other modulation recognition methods use a combination of techniques, including pattern recognition. Higher-order statistics have exploited cyclostationarity to identify modulation. Other methods have applied neural networks. A recent book by Azzouz and Nandi, *Automatic Signal Recognition of Communications Signals* (Kluwer, 1997), gives details on these and other recent techniques for identifying modulation types.

A more recent approach to modulation recognition is to apply techniques from maximum-likelihood (ML) decision theory. A truncated infinite series to approximate likelihood functions is described by Long, et al, "Further Results in Likelihood Classification of QAM Signals", Proceedings of MILCOM-94, pp. 57–61, October 1994. A technique that uses demodulated BPSK and QPSK symbols, but assumes knowledge of carrier frequency and phase is described by Sampiano and Martin, "Maximum Likelihood PSK Classifier", MILCOM-96, pp 1010–14, 1996. A comprehensive review of the literature on signal classification, which includes methods based on ML decision theory, is presented in Boiteau and Le Martret, *A Generalized Maximum Likelihood Framework for Modulation Classification*, International Conference on Acoustics, Speech, and Signal Processing, 1998.

SUMMARY OF THE INVENTION

One embodiment of the invention is a computer-implemented signal recognizer for classifying noncooperative signals. An up/down detector detects the presence of a signal of interest. A signal classifier has a number of classifier modules, each module associated with a different signal modulation type. Each module is operable to perform the following tasks: to receive the detected signal in digital form, to estimate parameters of said signal, to demodulate said signal based on estimated parameters, to determine a candidate signal type having said estimated parameters, and to calculate confidence data representing the extent to which said signal is likely of said candidate signal type versus not of that signal type. A confidence analyzer receives confidence data from each module and determines a best signal type from the candidate signal types determined by the modules. A graphical user interface may be used to control tasking and to view the status and the results of signal recognition process.

An advantage of the invention is that it detects and demodulates a signal that may be any one of a number of unknown signal types. These signals include analog signals, such as AM, FM, USB, LSB, and digital signals, such as OOK, ASK, FSK, MSK, PSK, and QAM. Thus, a wide variety of signal types can be recognized, including all widely used digital communication signals.

All signal parameter detection and analysis is performed with software. The software may be executed on various hardware platforms, including general purpose processor systems. The signal recognizer may be used as a stand-alone device, remotely tasked, or integrated into narrowband or wideband systems.

In contrast to a set of dedicated hardware demodulators, which each independently attempt to demodulate an incoming signal according to configured parameters, the signal recognizer first processes the signal to determine its signal parameters. It then demodulates the signal according to the estimated parameters. To estimate the parameters, a hypothesis testing approach is used, but in contrast to other signal recognition techniques, the invention accommodates a wide variety of signal types. A "false alarm" test evaluates each candidate signal against the likelihood of it not being that signal.

The invention provides classification results with a minimum probability of error. It operates in environments characterized by multipath and low signal to noise ratios.

DESCRIPTION OF THE DRAWINGS

FIG. 21A is a scattergram, FIG. 21B shows amplitude, and FIG. 21C shows phase.

FIG. 22A is a scattergram, FIG. 22B shows amplitude, and FIG. 22C shows phase.

FIG. 23A is a scattergram, FIG. 23B shows amplitude, and FIG. 23C shows phase.

FIG. 24A is a scattergram, FIG. 24B shows amplitude, and FIG. 24C shows phase.

FIG. 25A is a scattergram, FIG. 25B shows amplitude, and FIG. 25C shows phase.

FIG. 26A is a scattergram, FIG. 26B shows amplitude, and FIG. 26C shows phase.

FIG. 27A is a scattergram, FIG. 27B shows amplitude, and FIG. 27C shows phase.

DETAILED DESCRIPTION OF THE INVENTION

System Overview

Figure 1:
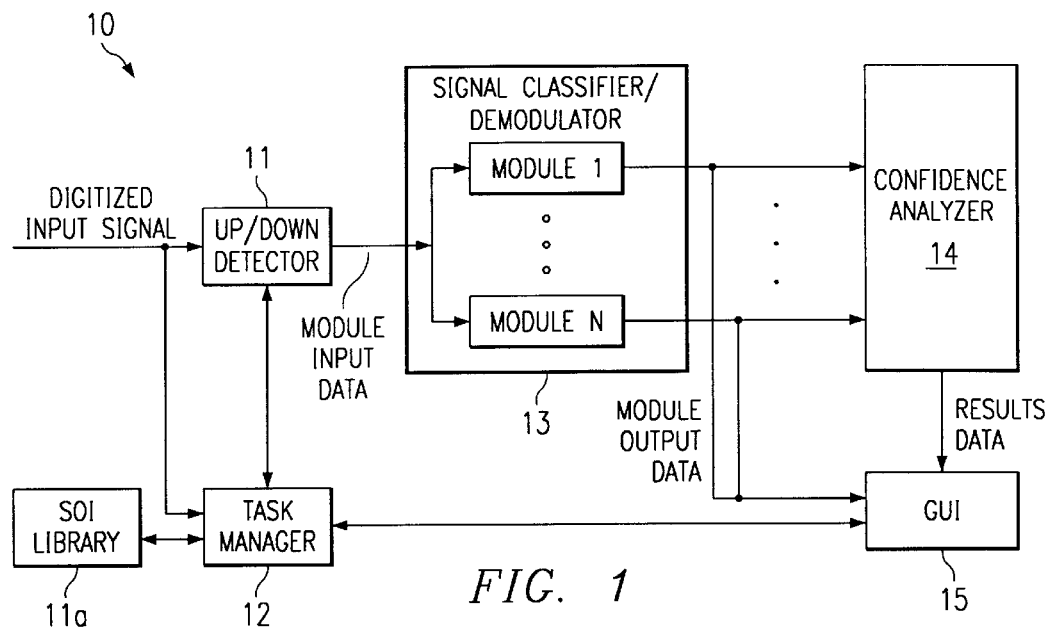
FIG. 1 is a block diagram of the basic components of a signal recognizer in accordance with the invention.

FIG. 1 is a block diagram of the basic components of a signal recognizer 10 in accordance with the invention. Signal recognizer 10 and the various elements of FIG. 1 are different processes within an integrated software system that comprises signal recognizer 10.

The computer programming used to implement signal recognizer 10 may be stored and executed on any number of different types of commercially available computer hardware platforms. For example, recognizer 10 could be implemented using a general purpose CPU, such as those in "personal computers" that run a windows-type operating system. As another example, recognizer 10 could be implemented as an embedded "computer on a card" in part of a larger system. Recognizer 10 has been successfully implemented with an object-oriented C programming language; any processor capable of executing C code would be suitable for use in implementing recognizer 10.

Recognizer 10 can further be implemented in a multiprocessor architecture, by using messaging between processors. That is, the various functions of recognizer 10 could be divided among more than one processor. For example, control processing such as that performed by up/down detector 11, SOI library 11a, and task manager 12, could be implemented on one processor. Module processing, such as that performed by signal classifier 13 and confidence analyzer 14, could be implemented on another.

In the example of this description, signal recognizer 10 is a stand alone system. In other embodiments, signal recognizer 10 could be integrated into larger narrowband or wideband systems. It may also be implemented as a remotely tasked system, where control inputs and outputs are remote from the signal receiving and processing elements.

The input signal is a sampled waveform. It may represent any radio frequency signal, digital or analog, including HF, UHF, and VHF frequencies. The input signal may be received in real time, such as from an A/D converter, or from a memory device, such as from a wavefile. The modulation type can be linear or nonlinear. The signal need not be a "cooperative" signal; there is no requirement for a handshaking protocol for receipt of signal parameter data.

Up/down detector 11 determines the presence of a signal of interest. Specifically, it analyzes the incoming signal spectrum to distinguish a signal from noise by analyzing signal characteristics such as amplitude and a confined bandwidth. Once a signal is detected, its "signal up time"

(the time the signal begins) is recorded. The duration of the signal is counted until a "signal down time" (the time when the signal ends). The data provided by up/down detector 11 includes the following: time up, time down, bandwidth, and signal to noise (S/N) ratio.

In simple embodiments, up/down detector 11 selects only the strongest signal as the signal of interest. In other embodiments, up/down detector 11 could be used to detect a signal of interest within a particular frequency. Or, signal recognizer 10 could be modified so as to process a number of signals of interest, processed on parallel paths, and up/down detector 11 could be used to detect these multiple signals. In any of these cases, up/down detector 11 may be implemented so that it automatically detects and switches to a new signal of interest when an old one ends or when a new signal that is considered "more important" begins.

A signal of interest (SOI) library 11a can be used to compare the input signal with a library of signals. For example, SOI library 11a might contain descriptions for a number of signals of interest. Then, if the detected signal is not one of these signals, it need not be reported. In the example of this description, SOI library 11a receives both the input signal and data from up/down detector 11 and compares data from these inputs to its stored data. The output of SOI library 11a is delivered to task manager 12, so that only designated modules of signal classifier 13 need operate on the current input signal.

Task manager 12 receives the input signal, and handles control functions within recognizer 10. The data provided by task manager 12 to signal classifier 13 includes the data from up/down detector 11 and any "steerage" data indicating specific modules that are to process the data. An example of one implementation of recognizer 10 is to create each module within signal classifier 13 as an object that is created by task manager 12. In operation, the task manager 12 makes a call to an object creation routine that allocates and initializes memory.

The digital bitstream representing the input signal is routed to signal classifier 13. As explained below, signal classifier 13 has a number of modules, each associated with a different type of signal modulation. The input signal is processed simultaneously by each of the modules, each of which is capable of determining various signal parameters, such as modulation type, carrier frequency, and baud rate. For any signal type, the associated module of signal classifier 13 provides all information necessary to demodulate the signal.

Figure 2:
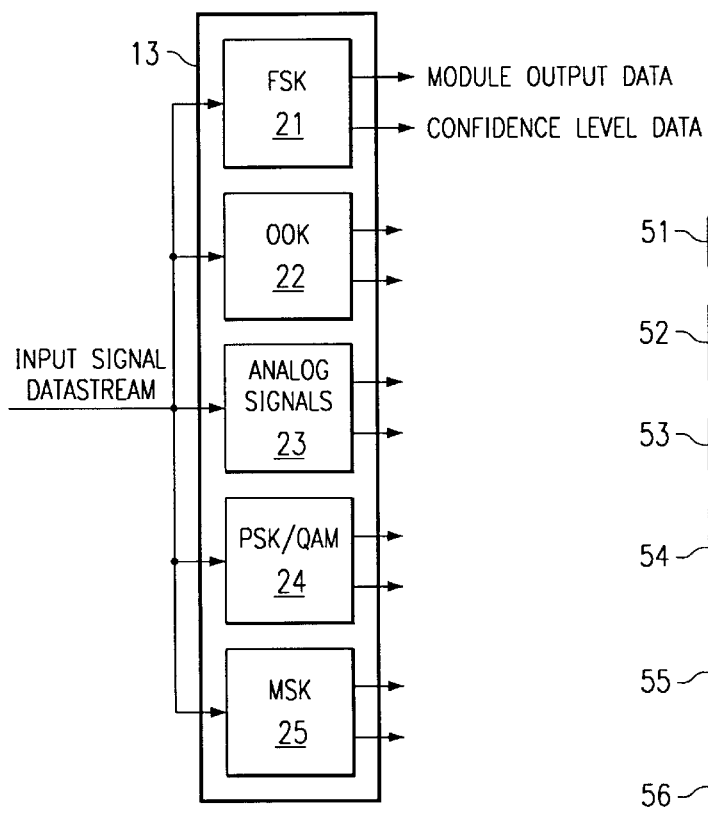
FIG. 2 illustrates an example of the signal classifier of FIG. 1, having five classifier modules.

FIG. 2 illustrates an example of signal classifier 13, having five classifier modules 21–25, each of which detect one or more of various signal types: frequency shift keying (FSK), on-off keying(OOK), analog signals (AM, FM, USB, and LSB), and phase shift keying (PSK) and quadrature amplitude modulation (QAM) (PSK/QAM), minimal shift keying (MSK). Examples of other signal types that could be supported include ASK, MFSK, and multi-tone.

In an example implementation, as data is received by a module of signal classifier 13, it is placed in a circular buffer. Parameter estimation algorithms described below require large amounts of data to achieve accurate estimates, such as for carrier frequency and baud rate. As explained below, a typical module operates by first estimating parameters, then demodulating the signal, after which the demodulated symbols are processed to determine a confidence value for the modulation type.

The output of each module of signal classifier 13 includes the measured parameters, the demodulated signal, and confidence data. As explained in further detail below, the confidence data represents the extent to which the input signal is likely to be either a signal of the type recognized by that module or not that signal type. A threshold confidence value may used such that if the threshold is not exceeded, the signal is reported as unknown.

Referring again to FIG. 1, confidence analyzer 14 processes the confidence data provided by signal classifier 13. Confidence analyzer 14 receives a confidence rating for each candidate signal detected by modules 21–25. Based on these confidence ratings, as well as other built-in logic, it determines the best candidate from the candidate signal types.

As an example of other logic that may be applied by confidence analyzer 14, various modulation types are assigned different weighting values. In the example of this description, the weighting values are between 1 and 20. Signals having a high likelihood of occurrence, such as FSK and OOK are assigned high weighting values, say 20. Other signals, such as AM/FM, might be assigned a weighting value of 15; whereas signals with a low likelihood of occurrence, such as PSK and QAM, might be assigned a weighting value of 10.

Other knowledge may be used by confidence analyzer 14 to assist in its decision making process. For example, analyzer 14 makes use of the fact that FSK signals are a subclass of FM signals. Thus, if both the FM module and the FSK module provide a high confidence level, this fact points to a probability that the signal is an FSK signal.

Although in the example of this description, there is only one input signal, recognizer 10 could be easily modified to process more than one input signal. As an example, up/down detector 11 might detect the three strongest signals, and task manager would provide tracking functions to differentiate between signals. Duplicate signal classifiers 13 and confidence analyzers 14 would each process one of the signals.

Graphical User Interface

Figure 3:
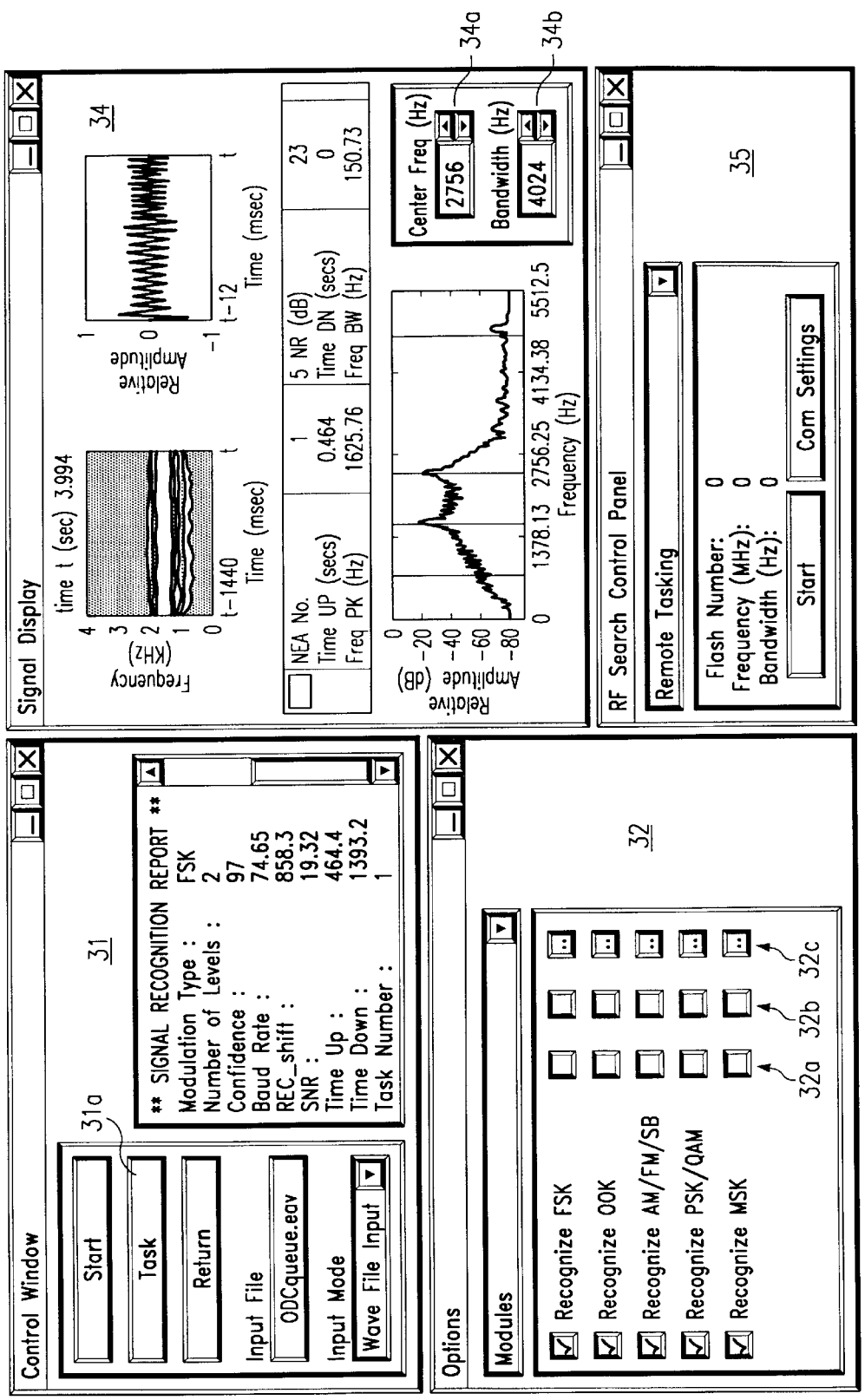
FIG. 3 illustrates an example of a display screen generated by the graphical user interface of the signal recognizer.

FIG. 3 illustrates an example of a display of graphical user interface (GUI) 15. As illustrated, GUI 15 is a windows-based interface, and in the example of this description has four "open" windows.

A control window 31 has various control buttons, including a start, stop, and task button. An input file bar displays the name of the current input file. A menu permits the user to select an input mode, for example, a wave file input mode.

Task button 31a implements a manual mode of recognizer 10. Specifically, task button 31a permits the user to view a spectrum being displayed in window 34, to select a frequency range, and to instruct task manager 12 to input that signal for processing. In this manner, the operation of the up/down detector 11, i.e., the selection of the current signal (s) of interest, can bypassed by the user.

Control window 31 also displays a signal recognition report for the current signal of interest. The signal's modulation type and other parameters are displayed in accordance with the output of confidence level analyzer 14. As indicated by the example of FIG. 3, the input signal has been determined to be an FSK signal with 2 levels. A confidence level is 97%. Other parameters include the baud rate, the signal to noise ratio (SNR), and the shift between frequencies. The report also displays the time up and time down, as determined by up/down detector 11. A task number can be used to associate the signal of interest with a processing task identifier.

An options window 32 has a pull-down options menu, which is shown with the modules option selected. The modules option permits modules of signal classifier 13 to be turned on or off, using a checkbox. For each module, a pair of indicator boxes displays the processing status of that module. A first indicator box 32a changes color depending on whether the module is active or inactive. A second indicator box 32b changes color depending on whether the results of the processing were positive or negative. Additionally, for each module, a detail button 32c can be activated to permit the user to view detailed information about the processing status of any module.

The options menu of window 32 also has a configuration option (not shown), which may be selected. An example of a configuration option is a sampling rate option, which permits the user to set the sampling rate of the input signal.

A signal display window 34 provides various graphics displays of the input signal. In the example of FIG. 3, these displays include plots of time versus frequency, time versus amplitude, and frequency versus amplitude. The frequency versus amplitude display is accompanied by two pairs of up/down buttons 34a and 34b. These up/down buttons 34a and 34b permits the user to select a region of spectrum.

A search control window 35 may be used when detector 10 is integrated into a larger system. For example, detector 10 may be in communication with a wideband receiver (not shown) via an RS-232 connection. The wideband receiver may be used to detect signals within a certain bandwidth and frequency range. When a signal is detected, its bandwidth and frequency may be communicated to detector 10, which then tunes in the signal and processes it to determine its parameters.

Figure 4:
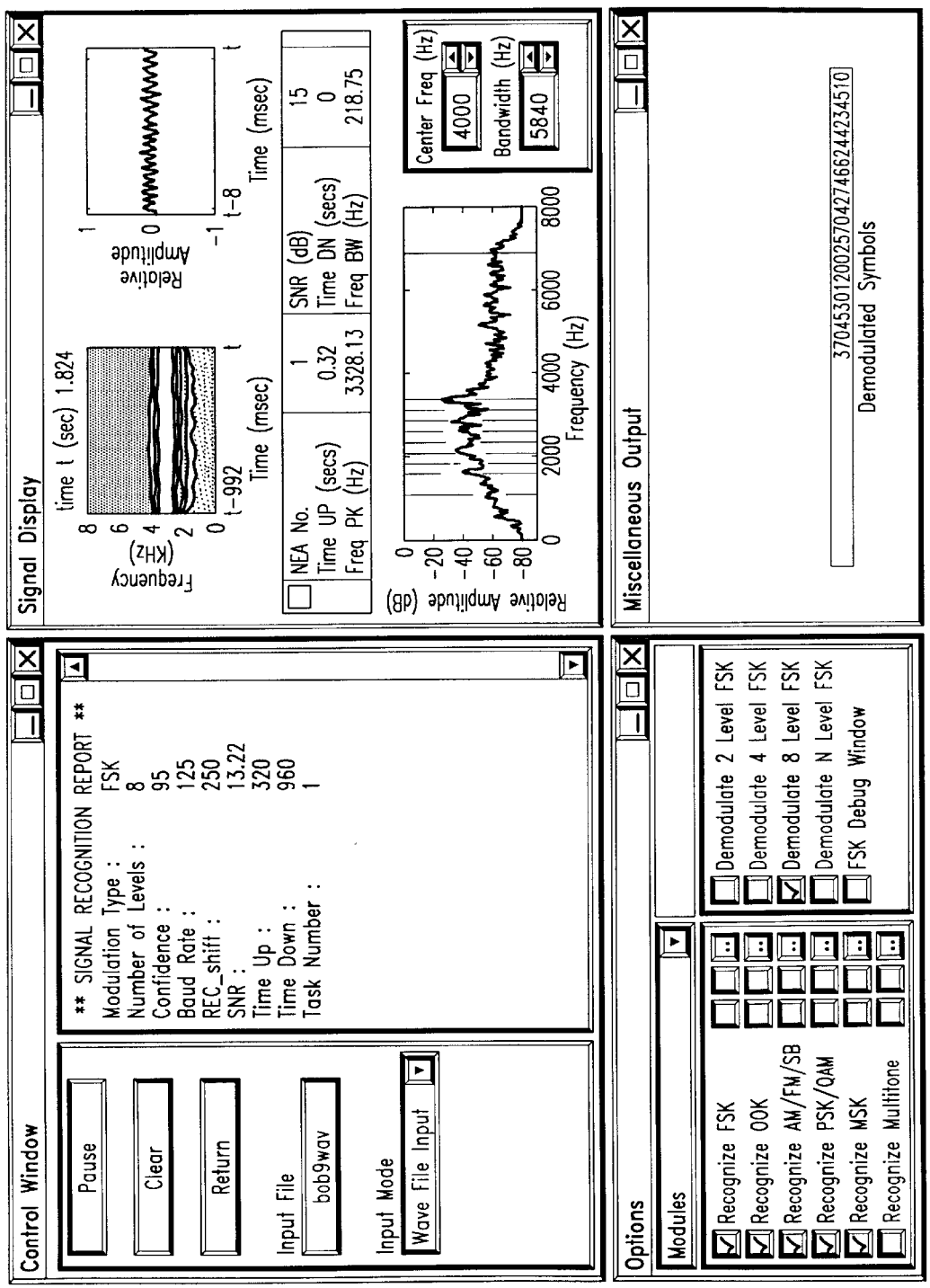
FIG. 4 illustrates an example of an alternative window for the display of FIG. 3.

FIG. 4 illustrates a miscellaneous output window 41. This window 41 may be activated for other views of the signal, as an alternative to one of the windows of FIG. 3. In the example of FIG. 4, window 41 replaces window 35 of FIG. 3 and displays the demodulated bitstream of the signal.

Signal Classification

Referring again to FIGS. 1 and 2, as stated above, signal classifier 13 receives the input signal of interest. The signal is then input to each of a number of different processing modules 21–25, each designed to detect a different modulation type and other signal parameters. Modules 21–25 operate in parallel, each executing different programming depending on the type of signal it is designed to detect. However, modules 21–25 have certain common operating characteristics.

Figure 5:
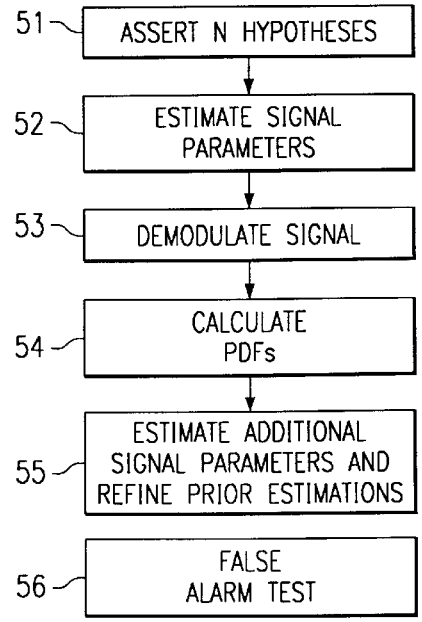
FIG. 5 illustrates operating processes common to the classifier modules of FIGS. 1 and 2.

FIG. 5 illustrates operating processes common to classifier modules 21–25. A general approach for multiple hypothesis testing is illustrated; additional detail for each of the various modules is further described below. As explained below, some modules begin with a single hypothesis, and need not perform Steps 51 and 54. However, all modules perform composite hypothesis testing by estimating parameters and demodulating the signal to arrive at a candidate signal type.

In Step 51, the module considers a number of hypotheses, each of which represent a subclass of the signal class associated with that module. The module's task is to narrow the candidate signal to one subclass. In this manner, a multiple hypothesis test is converted to a simple hypothesis test. This avoids the need to perform subsequent steps for each different subclass of the signal type. As explained below, the subclasses used for multiple hypotheses can be for parameters that have a finite number of possibilities, such as the number of levels of an FSK signal. For QAM signals, the subclasses are various QAM configurations.

In Step 52, the module estimates one or more signal parameters, such as baud rate, carrier frequency, or signal to noise ratio. As compared to parameters used to distinguish between multiple hypotheses analysis, estimated parameters are those whose values are a continuum of values. Regardless of which module 21–25 is performing Step 52, there are a variety of parameter estimation techniques.

Various parameter estimation techniques are described below for PSK/QAM module 24. Spectral-estimation techniques exploit cyclostationary properties of the PSK/QAM signal to estimate carrier frequency and baud rate. For PSK/QAM signals the parameters estimated in Step 52 are carrier frequency and symbol rate (or baud rate). The carrier frequency is initially estimated using a Blackman-Tukey spectral estimation technique. Baud-rate estimation is accomplished by combining a spectral analysis technique with a Euclidean algorithm. Similar techniques may be used for other modules.

Step 53 is a demodulation step, during which the waveform is converted into symbols. The signal is assumed to have the type associated with the module, and to have the parameters estimated in Step 52. The result of Step 53 is a string of symbols represented by the input signal. These symbols are used as the basis for hypothesis testing.

Various techniques used during the demodulation process, such as matched filtering, adaptive equalization, symbol-timing recovery, interpolation, and carrier recovery, are explained in detail below in connection with PSK/QAM demodulation. As explained below, for PSK/QAM signals, once frequency and baud are known, Step 53 recovers I- and Q-channel symbols. This includes processing the signal through a balanced mixer followed by a matched filter. The matched filter integrates the signal energy over time to maximize signal-to-noise ratio (SNR) by rejecting out-of-band noise. This filter is most effective when it is matched to the signal waveform that is received. The received waveform is dependent on the transmitter's pulse shape and the propagation channel, which is generally time-varying. Mismatch in the matched filter processing introduces intersymbol interference, which can severely degrade performance. An equalizer is used to mitigate the intersymbol interference introduced by the channel and mismatch in the matched filter. Conventional communication systems are cooperative and utilize a training sequence for this purpose. Because the signal of interest is received from a noncooperative transmitter, the recognizer must perform equalization blindly, without a training sequence. After the matched filter output is equalized, a symbol-timing recover algorithm is used in combination with interpolation to generate the I- and Q-channel symbols. A superresolution algorithm is used on the I/Q symbols to remove any residual carrier offset.

In Step 54, multiple hypotheses are reduced to a simple hypothesis. Essentially, Step 54 uses maximum likelihood techniques, based on an approximation of underlying probability density functions (PDFs) that govern the symbol data. Computations are reduced by using Gaussian approximations of the probability density functions. The signal is tested under each hypothesis to determine which one best matches the received signal. This process is described below, using PSK/QAM module 24 as an example.

In Step 55, parameters that have not already been estimated are estimated for the candidate signal type. Additionally, the results of Step 54 may be used to refine estimations for parameters that have already been estimated in Step 52. For example, in the case of PSK/QAM signals, as explained in detail below, after the signal is demodulated, a carrier frequency estimation is refined by applying a superresolution technique on the QAM symbols.

Step 56 is a "false alarm" test, during which each module calculates a confidence rating for its candidate signal type. Although Step 54 determines a best match between candidate signal types, if the signal is not one of these candidate types, Step 54 does not indicate a mismatch. Thus, in Step 56, the signal is evaluated in terms of whether it is a signal of the best candidate signal type or whether it is not that type.

Step 56 involves the use of empirical and statistical calculations, an example of which is discussed below in connection with PSK/QAM module 34, where the false alarm rate is determined as a function of signal to noise ratios. The same principles can be applied to the other modules.

Referring again to the GUI 15 of FIG. 3, each module provides a "positive" or "negative" indication output for display.

Each module 21–25 performs the process of FIG. 5 in parallel, but with algorithms tailored for its associated signal types. The output data from each module 21–25 comprises a set of signal parameters, the demodulated signal, and a confidence rating.

As an example of the process of FIG. 5, consider FSK module 21, which performs a multiple hypothesis test for the FSK class of signals. In Step 51, the FSK module asserts several hypotheses, each associated with a different signal level, i.e., two level, four level, and eight level. In Step 52, the FSK module estimates signal parameters, assuming the signal to be an FSK signal. The estimated parameters are tone frequencies and baud rate. In Step 53, the signal is demodulated according to the estimated parameters. In Step 54, the FSK module identifies a candidate signal type as one having a certain number of levels and the estimated parameters. In Step 56, the FSK module determines the confidence level that the signal is an FSK signal having that number of levels and those parameters. For example, if the testing determines that the signal is a two-level FSK signal with a certain frequency, the signal is evaluated to determine the confidence level for that type of signal.

Another module that uses multiple hypothesis testing is the PSK/QAM module 24. A detailed description of this module 24 is set out below. As explained therein, module 24 asserts six hypothesis for six different PSK/QAM modulation types. The reduction to a single hypothesis is dependent on an estimation of a signal-to-noise (S/N) ratio of the input signal. Specifically, probability density functions used in the selection of the hypothesis are controlled by the S/N ratio.

MSK module 25 is a simple hypothesis test; MSK signals are typically associated with only two levels. Thus, the hypothesis is simply whether or not the signal is a two level MSK signal. Although MSK module 25 is a simple hypothesis module, it is also a composite hypothesis module. Thus, in Step 52, module 25 executes a special baud rate and frequency estimation process for MSK signals. After the baud rate and frequency for the input signal are estimated, the candidate signal is a two level MSK signal having certain frequency and baud rate parameters. in Step 56, MSK module 25 calculates a confidence level with respect that candidate signal.

OOK module 22 operates in a manner similar to MSK module 25. Beginning with Step 52, it estimates words per minute, frequency, and bandwidth. In Step 56, module 22 calculates the confidence data representing the likelihood that the signal is an OOK signal having those parameters versus a non-OOK signal.

Analog module 23 performs multiple hypothesis testing. Specifically, module 23 selects between a number of hypotheses, such as between subclasses for AM, FM, USB, LSB, DSB, or CW signals. Step 52 is performed by estimating center frequency.

Classification for PSK/QAM Signals; Parameter Estimation Details

Referring again to FIG. 2, one of the modules of signal classifier 13 is a PSK/QAM module 24. The following discussion provides details of the operation of module 24.

QAM demodulation requires accurate estimates of the carrier frequency and symbol rate. Blackman-Tukey spectral estimation is used to find the approximate carrier frequency and signal band-width. These estimates are used to center tune and filter the signal. Next, the signal is squared and analyzed in the Fourier domain to estimate the symbol rate.

Figure 6:
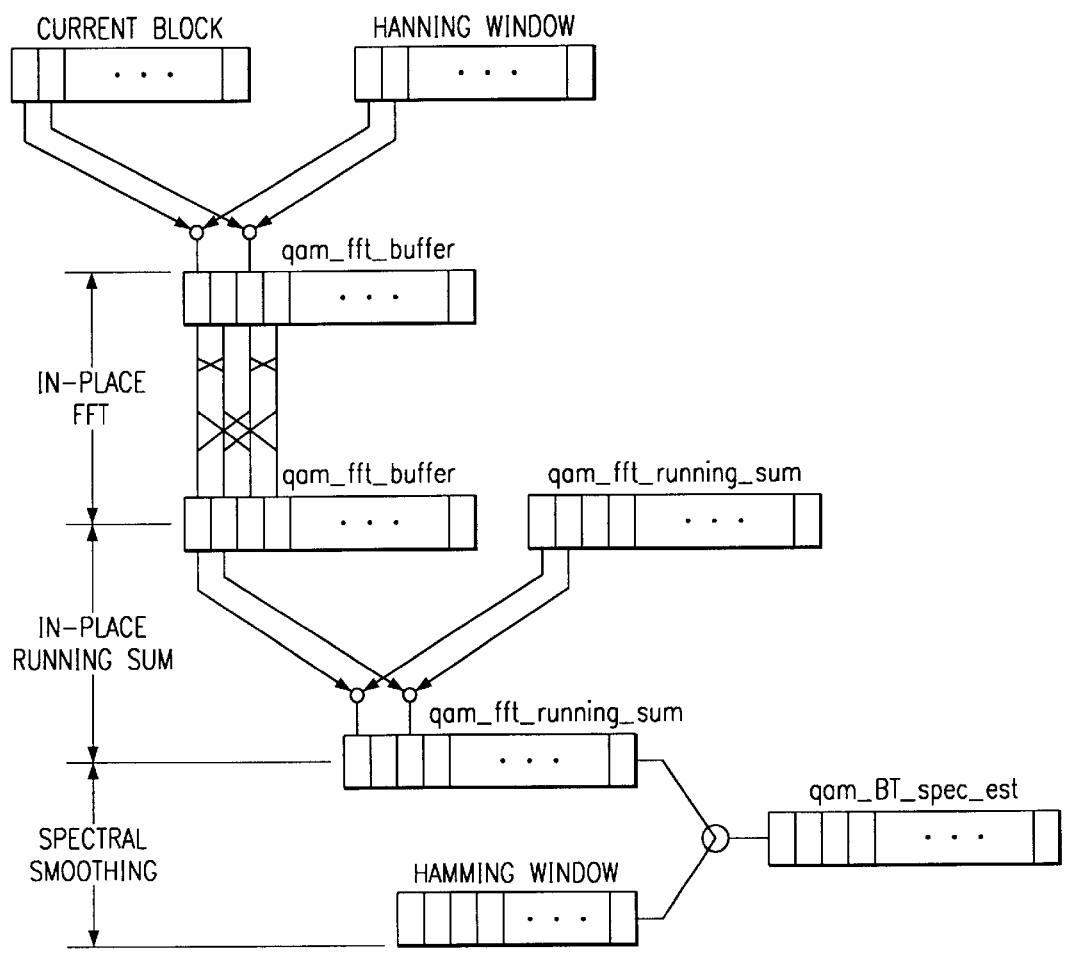
FIG. 6 illustrates a spectral estimation process used for the PSK/QAM module of FIG. 2.

FIG. 6 illustrates a Blackman-Tukey spectral estimation process, which is essentially a smoothed periodogram that reduces the variance of the spectral estimate at the expense of introducing a small bias. The spectral estimate is calculated by first finding the windowed periodogram of the input data. The windowed periodogram is found by multiplying each input frame (or block) of complex-valued samples by a Hanning window and then calculating the Fast Fourier Transform (FFT) of the result. The FFT is calculated "in place" using the buffer qam_fft_buffer. The spectral estimate is based on the magnitude squared of the FFT result. These values are summed together to find an averaged spectrum. Again, this summation is calculated in place with, the buffer qam_fft_running_sum. The averaged spectrum is then smoothed by convolving it with a short Hamming window.

Once a sufficient number of data frames have been processed, the carrier frequency and bandwidth are calculated. The Blackman-Tukey spectral estimate is represented as $R(e^{j\omega})$. The carrier frequency $$\omega_c = \frac{2\pi f_c}{F_s}$$

is estimated by finding the first moment of the spectral estimate:

$$\hat{\omega}_c = \frac{\int \omega R(e^{j\omega}) d\omega}{\int R(e^{j\omega}) d\omega}$$

The bandwidth is estimated from the 3 dB points of the power spectrum.

Figure 7:
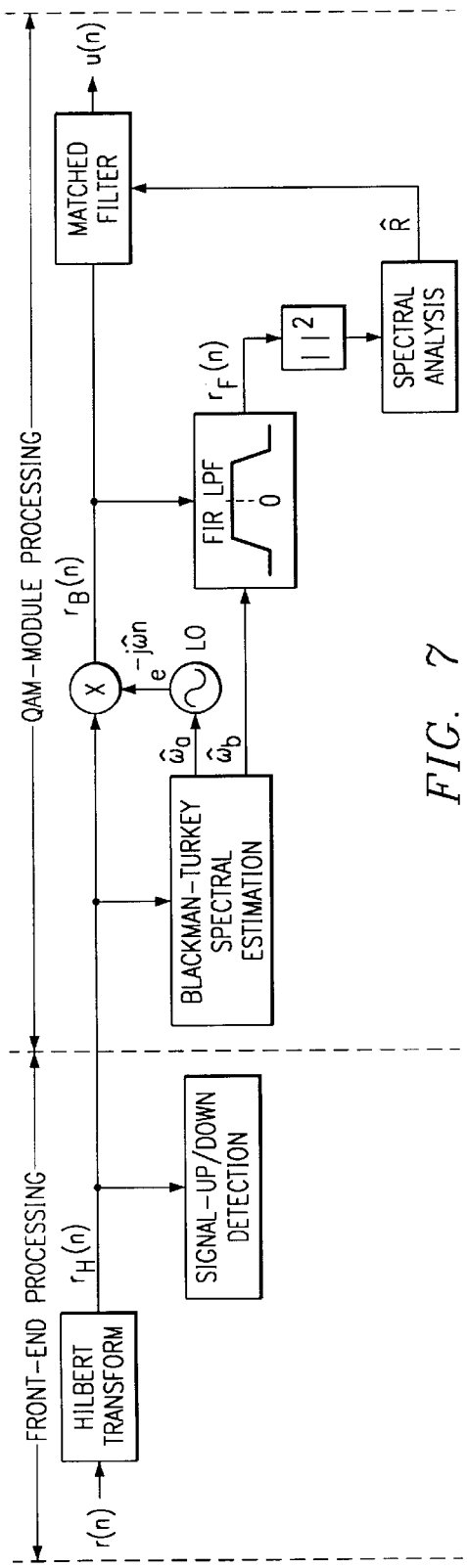
FIG. 7 illustrates a symbol rate estimation process performed by the PSK/QAM module of FIG. 2.

FIG. 7 illustrates the symbol rate estimation process. This parameter is used both to determine the matched-filter coefficients and perform symbol-timing recovery. Symbol rate estimation is facilitated by using the frequency estimate $\hat{\omega}$ to translate the received signal to baseband. Next, the bandwidth estimate is used to construct a lowpass filter (LPF) for mitigating the affect of noise on the symbol-rate estimate. After the baseband signal is filtered, it is squared in magnitude and analyzed in the Fourier domain using an FFT. Since high frequency resolution is necessary to determine the symbol rate accurately, the FFT length is considerably large. The mathematical derivation of the squaring-based algorithm is presented next. After the following derivation, the algorithm for constructing the LPF is described. The cyclostationary properties that are discussed are the basis for the symbol timing recovery algorithm presented below.

The envelope of a QAM waveform is cyclostationary, so that a symbol-timing tone can be derived. The expression for the baseband QAM signal m(t) is given by:

$$m(t) = \sum_{k=-\infty}^{\infty} a_k p(t - kT)$$

It is assumed that $\alpha_k$ is a zero-mean, uncorrelated, stationary, random sequence. It then follows that the baseband signal has a periodic autocorrelation function:

$$E[m(t)m'(t)] = e\left[\sum_{k=-\infty}^{\infty} a_k p(t-kT) \sum_{n=-\infty}^{\infty} a'_n(t-kT)\right]$$

$$= \sum_{k=-\infty}^{\infty} \sum_{n=-\infty}^{\infty} p(t-kT)p(t-nT)E[a_k a'_n]$$

$$= \sum_{k=-\infty}^{\infty} \sum_{n=-\infty}^{\infty} p(t-kT)p(t-nT)E[a_k a'_n]\delta(k-n)$$

$$= \sum_{k=-\infty}^{\infty} p^2(t-kT)E[a_k a'_n]$$

$$= E[m(t-kT)m'(t-kT)]$$

To determine the spectral components in the autocorrelation, the following expression, the Poisson Sum Formula:

$$\sum_{k=-\infty}^{\infty} x(t-kT) = \frac{1}{T} \sum_{n=-\infty}^{\infty} X\left(e^{j\frac{2\pi n}{T}}\right) e^{j\frac{2\pi nt}{T}}$$

is used, where $x(t)$ and $X(e^{j\omega})$ are a Fourier transform pair. If we assign $x(t-kT) = p^2(t-kT)$, then $$X(e^{j\omega}) = \int_{-\infty}^{\infty} x(t)e^{-j\omega t} dt$$

$$= \int_{-\infty}^{\infty} p^2(t)e^{-j\omega t} dt$$

$$= \int_{-\infty}^{\infty} \frac{1}{2\pi} = \int_{-\infty}^{\infty} P(e^{j\omega_0})e^{j\omega_0 t} d\omega_0 p(t)e^{-j\omega t} dt$$

$$= \frac{1}{2\pi} \int_{-\infty}^{\infty} P(e^{j\omega_0}) \int_{-\infty}^{\infty} p(t)e^{-j(\omega-\omega_0)t} dt d\omega_0$$

$$= \frac{1}{2\pi} \int_{-\infty}^{\infty} P(e^{j\omega_0}) P(e^{-j(\omega-\omega_0)}) d\omega_0$$

Applying the Poisson Sum Formula to the previously described periodic autocorrelation function, and using the above expression for $X(e^{j\omega})$ gives the following Fourier series:

$$E[m(t)m'(t)] = \frac{E[a_k a'_k]}{T} \sum_{n=-\infty}^{\infty} C_n e^{j\frac{2\pi n}{T}t},$$

$$\text{where } C_n = \frac{1}{2\pi} \int_{-\infty}^{\infty} P(e^{-j\omega_0})P\left(e^{-j\frac{2\pi n}{T} - \omega_0}\right) d\omega_0$$

For raised cosine pulse shaping, $C_n = 0$ for all $n \neq -1, 0, 1$; that is, $E[s(t)s'(t)]$ is equal to the weighted sum of only three complex exponentials:

$$e^{-j\frac{2\pi}{T}t}; \tag{1}$$

$e^{-j0}$; and (3)

$$e^{j\frac{2\pi}{T}t}. \tag{3}$$

The presence of energy at the radian frequency $$\frac{2\pi}{T}$$

can be exploited to determine the symbol rate, $$R_s = \frac{1}{T}.$$

The baseband signal is filtered to reduce the affects of noise on the symbol-rate estimate. A filter design routine based on a windowing method is used to construct the LPF. The routine accepts as input the desired filter bandwidth $$\omega_b = \alpha \frac{2\pi f_b}{F_s}$$

and returns the filter order M and the filter coefficients $b_i$ i=0,1 ..., M−1. The LPF response is given by the following convolution summation:

$$r_F(n) = \sum_{i=0}^{M-1} b_i r_B(n-i)$$

The "ideal" LPF is characterized by either the frequency response:

$$H_d(e^{jw}) = \begin{cases} e^{-j\alpha w} & |\omega| \leq \omega_b \\ 0 & \text{otherwise} \end{cases}, \text{ or the impulse response}$$

$$h_d(n) = \begin{cases} \frac{\omega}{\pi} & \\ \frac{\sin(\omega b(n-\alpha))}{\pi(n-\alpha)} & n = \alpha \\ & n \neq \alpha \end{cases}$$

where $\alpha$ is a parameter to be defined. The ideal filter is unrealizable since it is noncausal. However, a causal approximation can be realized by truncating the impulse response to length $$M = 2\left[\frac{4\pi}{\omega_d}\right] + 1$$

and setting $$\alpha = \frac{M-1}{2}.$$

The realizable filter is defined by the impulse response:

$$h_r(n) = \begin{cases} h_d(n) & n = 0, 1 \ldots, M-1 \\ 0 & \text{otherwise} \end{cases}$$

The characteristics of the filter (sidelobe attenuation) can be improved by windowing. The windowed realizable impulse response defines the filter coefficients and is given by the following equation:

$$b_i = \begin{cases} \left(0.5 - 0.5\cos\left(\frac{2\pi n}{M-1}\right)\right)h_d(n) & i = 0, 1, \ldots, M-1 \\ 0 & \text{otherwise} \end{cases}$$

In practice, the LPF bandwidth is made slightly larger than the signal bandwidth to ensure the presence of a spectral tone at the symbol rate.

Classification for PSK/QAM Signals; Demodulation Details

Figure 8:
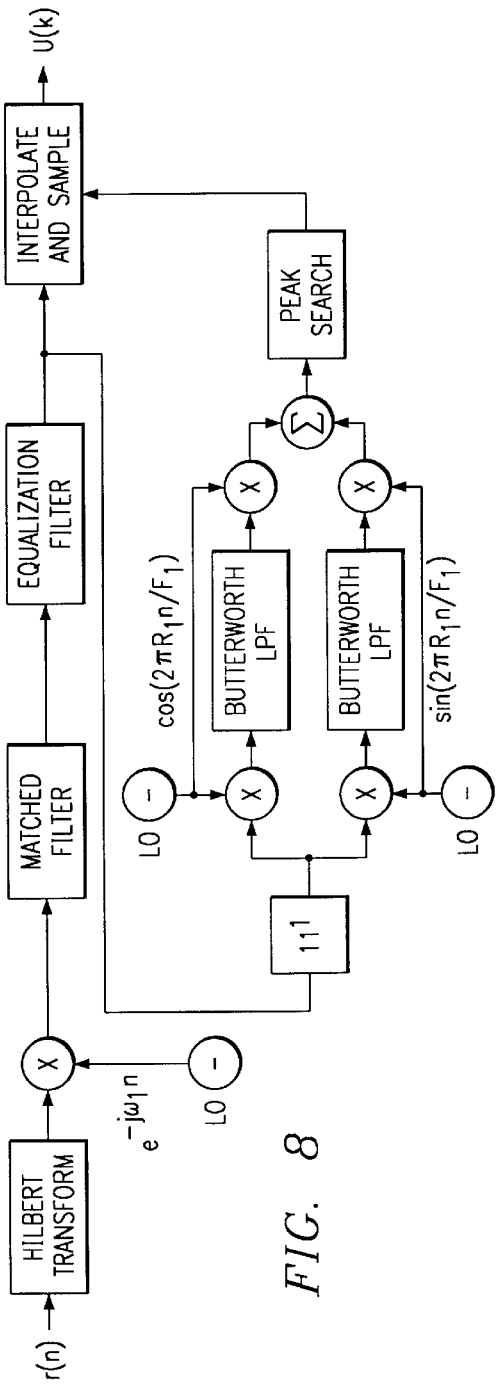
FIG. 8 illustrates a signal demodulation process performed by the PSK/QAM module of FIG. 2.

FIG. 8 illustrates PSK/QAM demodulation, which is the process that converts a waveform into symbols. It includes matched filtering, equalization, and symbol timing recovery.

Matched Filtering Waveforms used in QAM communication are constructed from pulse shapes that satisfy two requirements: bandwidth and zero-crossings. The pulse shape is designed such that the bandwidth $f_b$ of the waveform is approximately equal to the symbol rate $R_s$. It is also designed to have zero crossings in the time domain once every $$T = \frac{1}{R_s}$$

seconds so as to avoid intersymbol interference (ISI). ISI is a harmful mutual interaction of symbols in a received waveform. Nyquist has shown that a time-domain pulse p(t) will have zero crossings once every T seconds if and only if its Fourier transform $P(e^{j\omega})$ satisfies the following Nyquist criterion:

$$\sum_k P\left(e^{j\left(\omega + \frac{2\pi k}{T}\right)}\right) = \text{constant}, \; |\omega| \leq \frac{\pi}{T}$$

The Nyquist criterion is satisfied by the family of raised-cosine pulses defined by:

$$P(e^{j\omega}) = \begin{cases} T, & |\omega| < \frac{\pi(1-\alpha)}{T} \\ \frac{T}{2}\left\{1 - \sin\left(\frac{|\omega|t - \pi}{2\alpha}\right)\right\}, & \frac{\pi(1-\alpha)}{T} \leq |\omega| < \frac{\pi(1+\alpha)}{T} \\ 0, & |\omega| > \frac{\pi(1+\alpha)}{T} \end{cases}$$

The corresponding impulse-response function is given by:

$$p(t) = \frac{\sin(\pi t/T)}{\pi t/T} \cdot \frac{\cos(\alpha \pi t/T)}{1 - 4\alpha^2 t^2/T^2}$$

The parameter $\alpha$ is the excess bandwidth; it indicates the extent to which the signal bandwidth exceeds the symbol rate $$R_s = \frac{1}{T}.$$

Figure 9:
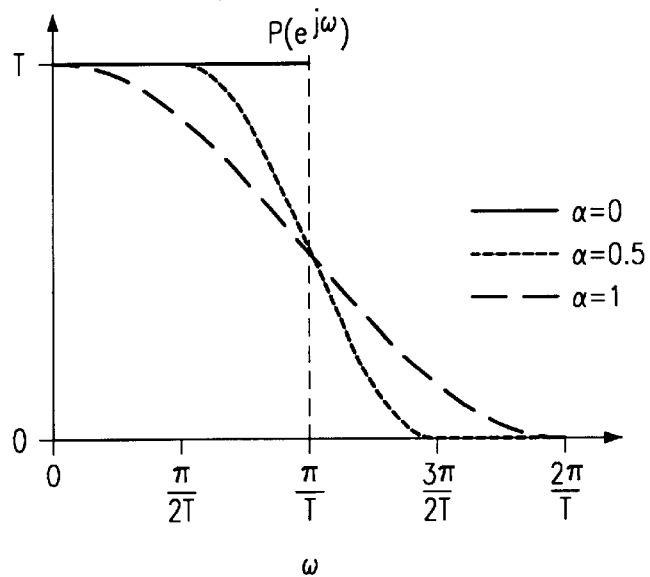
FIGS. 9 and 10 illustrate raised cosine spectral and temporal characteristics, respectively, for three values of excess bandwidth.
Figure 10:
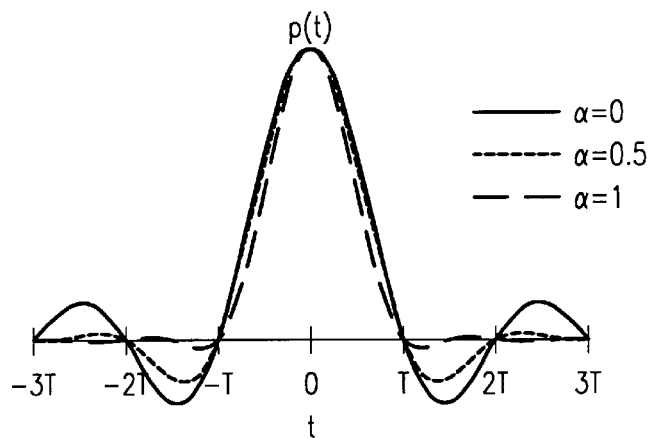

FIGS. 9 and 10 illustrate the raised cosine pulse spectral and temporal characteristics, respectively, for three values of excess bandwidth $\alpha$. As the excess bandwidth increases, the spectral characteristic expands and the temporal characteristic contracts. At one extreme where the excess bandwidth is $\alpha=0$, the signal bandwidth is equal to the symbol rate $$\frac{1}{2T}$$

and the temporal characteristic exhibits large sidelobes. At the other extreme where the excess bandwidth is $\alpha=1$, the signal bandwidth is twice the symbol rate and the temporal characteristic exhibits lower sidelobes. A salient feature in all cases is that the raised cosine pulse shape exhibits zero crossings at the points defined by $t_k=kT$, which is a requirement for zero intersymbol interference.

Figure 11:
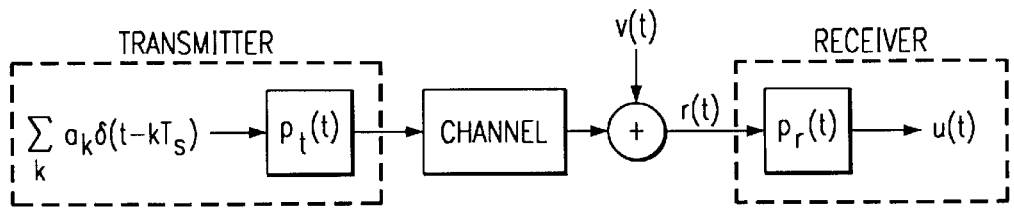
FIG. 11 illustrates a transmitter and receiver for the matched filtering process of FIG. 8.

FIG. 11 is a block diagram of a transmitter and receiver, where $p_t(t)$ is the transmit filter, $p_r(t)$ is the receive filter, and v(t) is additive noise. The receive filter is designed to maximize signal-to-noise ratio (SNR) by matching $P_r(e^{j\omega})=P_t(e^{j\omega})$. In most cases, the transmit filter has a square-root raised cosine (RRC) frequency response such that the cascade given by $P(e^{j\omega})=P_t(e^{j\omega})P_r(e^{j\omega})$ is a raised cosine pulse, which satisfies the Nyquist criterion. The impulse response for a RRC filter is given by:

$$p(t) = 8\alpha \frac{\cos\left(\left(\frac{1}{T} + 2\alpha\right)\pi t\right) + \sin\left(\left(\frac{1}{T} - 2\alpha\right)\pi t\right)(8\alpha t)^{-1}}{\pi\sqrt{T}\left((8\alpha t)^2 - 1\right)}$$

This filter depends on two parameters: symbol period T and excess bandwidth $\alpha$. The symbol period is estimated as described below. The excess bandwidth is unknown, but is estimated with the fixed constant value of $\alpha=0.75$. Intersymbol interference due to errors in $\alpha$ and channel distortion can severely degrade performance. The equalizer described next is used to remove intersymbol interference.

Adaptive Equalization The optimal receiver for removing ISI is generally nonlinear and computationally expensive. An alternative is to use an optimal linear receiver. A linear equalizer is suboptimal, but it is more viable computationally.

Figure 12A:
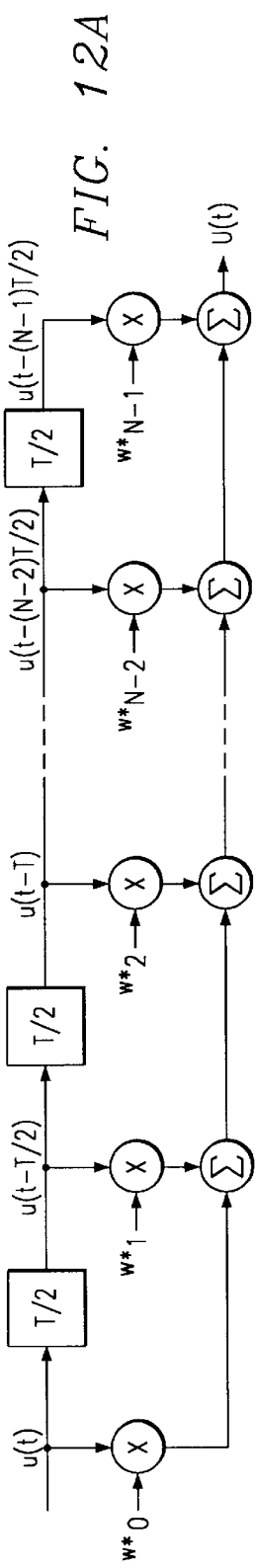
FIG. 12A illustrates an example of the equalizer of FIG. 8.

FIG. 12A illustrates the structure of a linear equalizer, where the integer N denotes the number of equalization coefficients. The equalization coefficients are complex valued and denoted by $\omega_i$, i=0, 1, . . . , N−1. The complex-valued input, denoted by u(t), is the received signal after basebanding and matched filtering. The equalizer shown in FIG. 12 is a T/2 fractionally spaced equalizer (FSE); that is, the input signal is passed through a tapped delay line with T/2 spacing where T is the symbol period. The equalizer output is given by:

$$U(t) = \sum_{i=0}^{N-1} \omega_i^* u\left(t - i\frac{T}{2}\right)$$

The equalizer coefficients are optimized to suppress intersymbol interference in the output U(t).

Figure 12B:
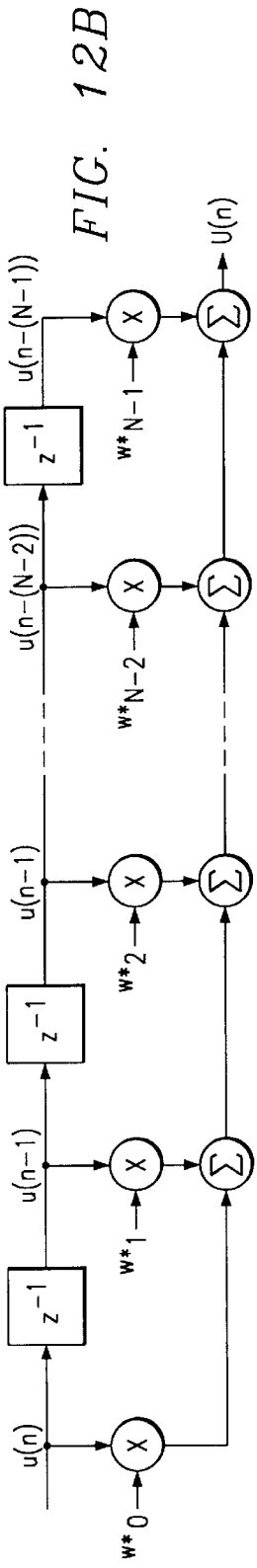
FIG. 12B illustrates a digital implementation of the equalizer of FIG. 12A.

FIG. 12B illustrates a digital implementation of the FSE, where the taps are spaced by one sample. The equalizer output is given by:

$$U(n) = \sum_{i=0}^{N-1} u(n - i)\omega_i^*$$

The equalization coefficients $\omega_i^*$ are adaptively adjusted once each symbol period using the constant modulus algorithm (CMA).

Figure 13:
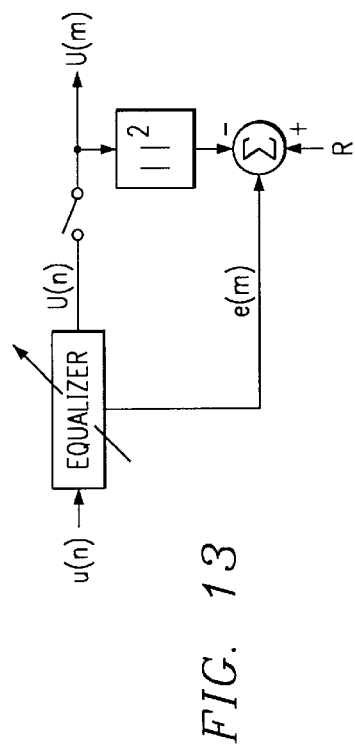
FIG. 13 illustrates a least mean squares algorithm applied to the equalization process.

FIG. 13 illustrates the adaptation, based on the popular Least Mean Squares (LMS) algorithm, where the error e(m)

between the decimated equalizer output $U_d(m)$ and a reference $R$ is computed for the $m^{th}$ symbol and used to update $\omega_i^*$. The equations for updating the equalization coefficients are given by:

$$\omega_i = \omega_i + \mu u(m-i)e'(m), \; i=0, 1, \ldots, N-1$$

where error $e(m)$ is given by:

$$e(m) = U(m)(R - |U_d(n)|^2)$$

the step size is $\mu$, and $$R = \frac{E[|u(n)|^4]}{E[|u(n)|^2]}$$

The CMA algorithm is based on a gradient descent analysis of the following cost function:

$$J(m) = E[(|U_d(m)|^2 - R)^2]$$

Symbol-Timing Recovery The QAM signal is received after some unknown propagation delay $\tau$ such that the received sign (neglecting noise) is given by:

$$r(t) = m(t-\tau) = \sum_{k=-\infty}^{\infty} a_k p(t - kT - \tau)$$

The symbols are recovered by sampling $r(t)$ at the instants $nT-\tau$. These sampling instants are determined using a popular squaring-based technique. As discussed above in connection with FIG. 7, the envelope of a QAM waveform is cyclostationary, so that a symbol-timing tone can be derived. Following the same arguments to derive equation (9), it can by shown that the autocorrelation function $E[r(t)r^*(t)]$ is periodic, with Fourier series given by:

$$E[r(t)r^*(t)] = \frac{E[a_k a_k^*]}{T} \sum_{n=-\infty}^{\infty} C_n e^{j\frac{2\pi n}{T}(t-\tau)}$$

where the coefficient $C_n$ is as expressed above. The coefficient $C_n$ is nonzero for only the three indices $n=-1, 0,$ and 1. These terms correspond to a DC component and the cosine function:

$$\frac{2e[a_k a_k^*]}{T} C_1 \cos\left(\frac{2\pi}{T}(t-\tau)\right)$$

The desired sampling instants occur at the positive-valued crests of this cosine function.

Referring again to FIG. 8, the algorithm for isolating this sinusoidal component is shown in block diagram form. The equalized signal is squared and then translated to DC through a balanced mixer. A narrowband Butterworth LPF is used to isolate the DC components.

Figure 14A:
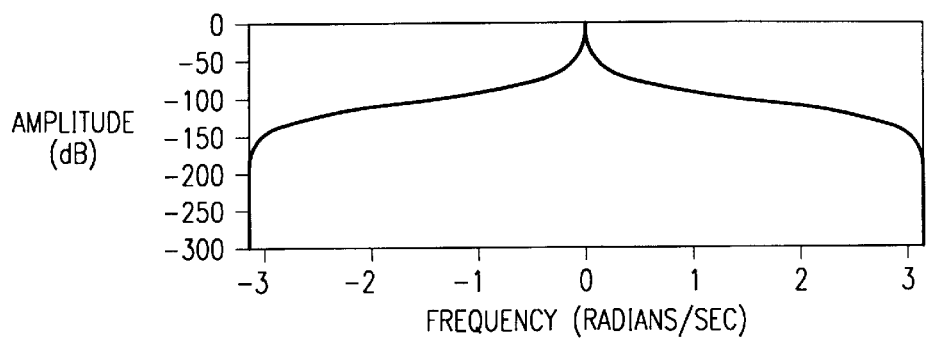
FIGS. 14A and 14B illustrate the frequency response of the Butterworth filter of FIG. 8.
Figure 14B:
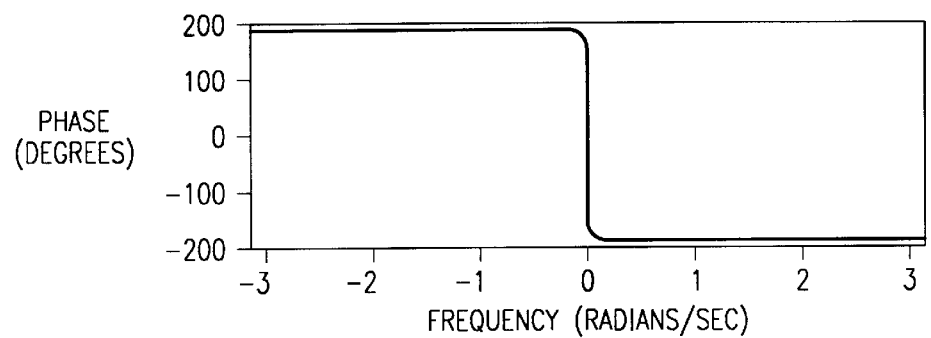

FIGS. 14A and 14B illustrate the Butterworth filter of FIG. 8, characterized by the frequency response. The Butterworth filter was selected for this application because it is characterized by zero phase in the center of the passband, thereby maintaining phase synchronization with the equalizer output that is to be sampled. Next, a balanced mixer is used to translate the complex-valued DC component back to a sinusoid with the desired frequency and phase. A peak search algorithm is used to locate the positive-valued crests of the resulting sinusoid.

The symbol-timing recovery algorithm may be enhanced by utilizing a Butterworth filter construction routine so that the balanced mixer and lowpass Butterworth filters can be replaced by a single bandpass Butterworth filter. This enhancement will improve real-time performance by reducing computation.

Interpolation When implementing a QAM demodulator in a digital wideband architecture, the sampling rate and phase are not controlled by the DSP processor. In conventional modems, the sampling rate is commensurate with the symbol rate and the sampling phase is synchronized with the symbol clock, thereby placing a sample exactly at the center of each symbol. If the sampling rate is not commensurate with the symbol rate, then the samples are shifted in a random fashion from the center of each symbol, which degrades performance. This degradation is particularly onerous for the sparse sampling rates that are required in real-time signal-recognition applications.

One approach to avoiding this degradation is to use a novel interpolation algorithm that improves performance when sparse incommensurate sampling cannot be avoided. The interpolation algorithm presented below can be used to mitigate intersymbol interference (ISI) that results from noncoherent sampling.

Figure 15:
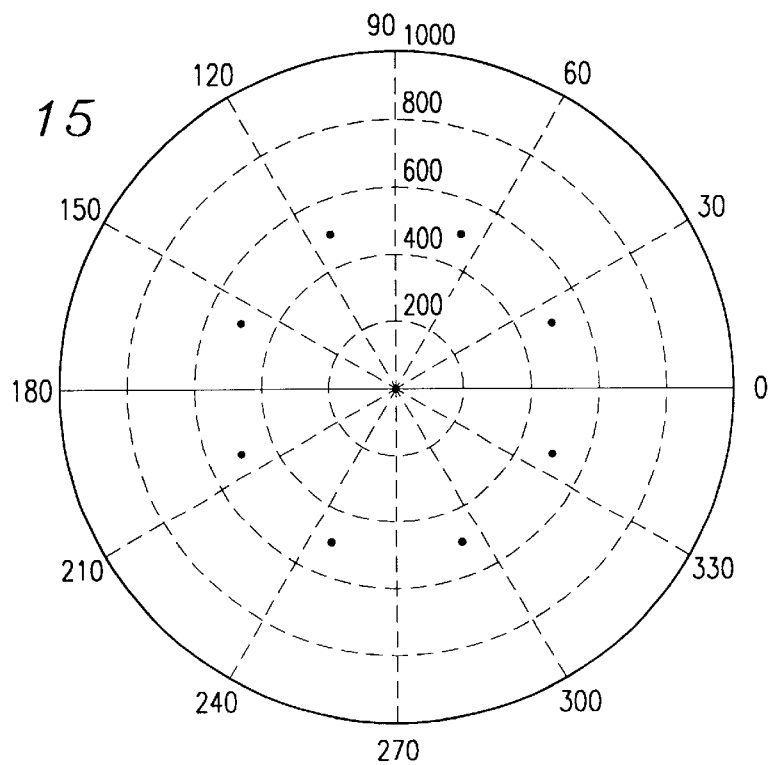
FIGS. 15 and 16 illustrate the shortcomings of noncoherent sampling.
Figure 16:
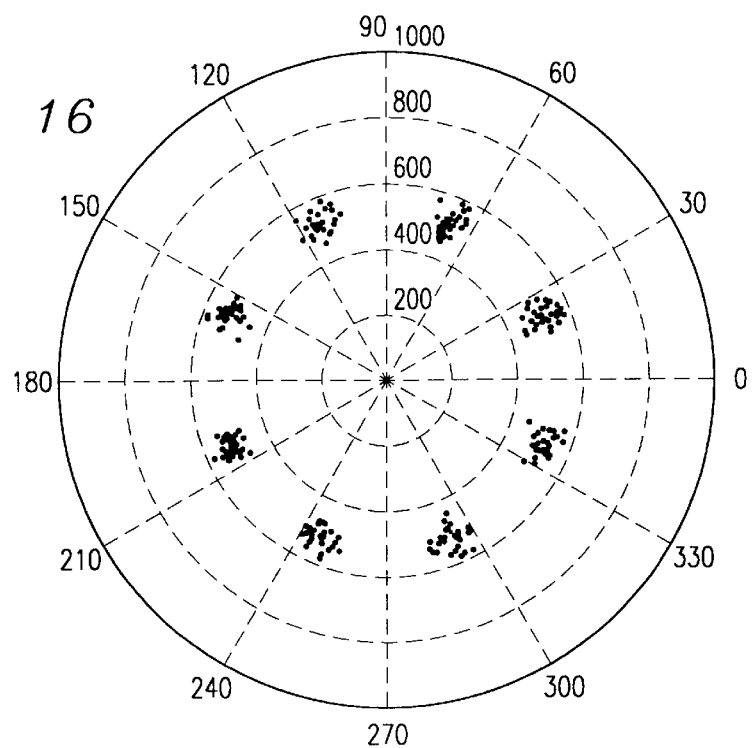

FIGS. 15 and 16 illustrate the shortcomings of noncoherent sampling. These figures show constellations for coherent and noncoherent sampling, respectively. In this case, the sampling rate is $F_s = 28800$ samples per second, which is commensurate with a symbol rate of $R_s = 3200$ symbols per second (9 samples per symbol). Commensurate samples are coherent if they align with the center of the symbol.

FIG. 15 shows the tight constellation that results from coherent sampling. Coherency may be achieved by adaptive equalization, which aligns the samples by introducing the appropriate phase shift in the equalizer's frequency response. These samples are clearly shown aligned on the center of the symbol (or center of the eye). Conventional commercial modems often achieve coherent sampling by controlling the sampling phase of the A/D converter.

FIG. 16 shows a constellation for fixed equalization with significant spreading due to noncoherent sampling. This figure clearly shows the noncoherency of the sampling by the displacement of the samples from the center of the symbols.

A comparison of FIGS. 15 and 16 reveals a significant performance loss due to noncoherent sampling. This loss can be mitigated by sampling at a higher rate, but this approach is often impractical.

Figure 17:
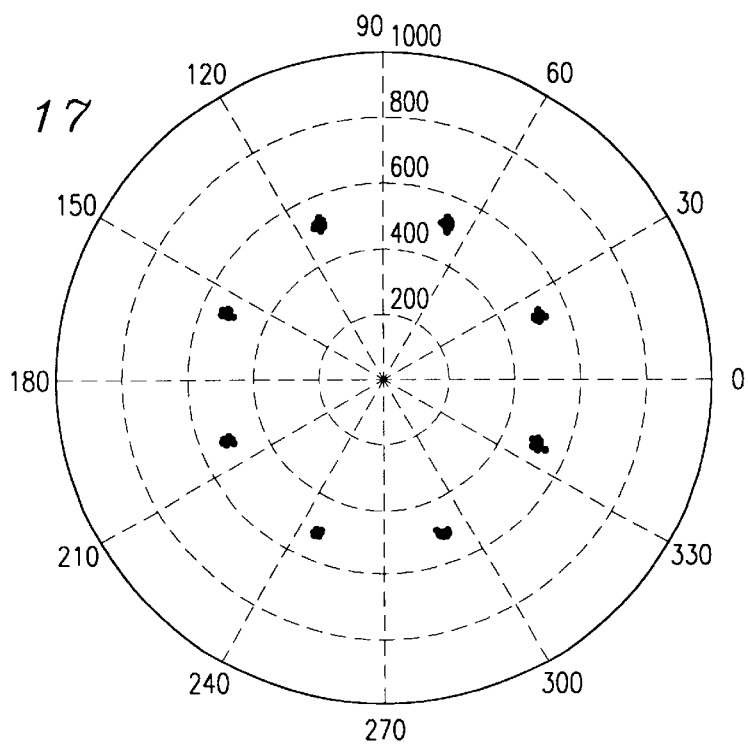
FIG. 17 illustrates how the effects of noncoherent sampling may be mitigated with interpolation.

FIG. 17 illustrates the constellation resulting from noncoherent sampling, using an interpolation algorithm as an alternative to higher sampling rates. As illustrated, the interpolation algorithm mitigates the effects of noncoherent sampling.

Figure 18:
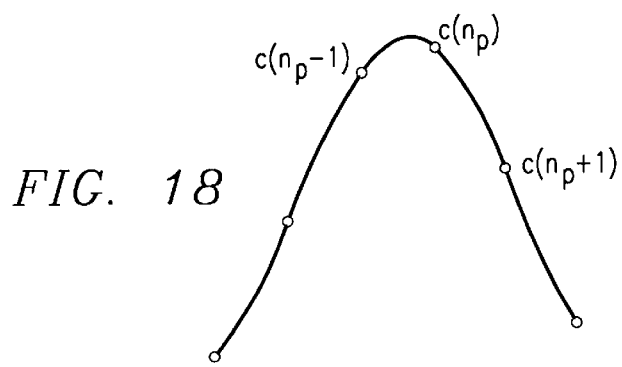
FIG. 18 illustrates notation for the interpolation process of FIG. 8.

FIG. 18 illustrates notation for the interpolation process of FIG. 8, as well as the effects of noncoherent sampling on the symbol-timing-recovery sinusoid. As described above, the symbol-timing sinusoid is recovered by squaring the received signal and filtering with a narrow bandpass filter centered at the symbol rate $R_s$. The crest of the sinusoid indicates the instant to sample the equalizer output for minimum ISI. The circles labeled $c(n_p-1)$, $c(n_p)$, and $c(n_p+1)$ represent noncoherent samples of the underlying symbol-timing sinusoid, which is indicated by the solid curve.

Figure 19:
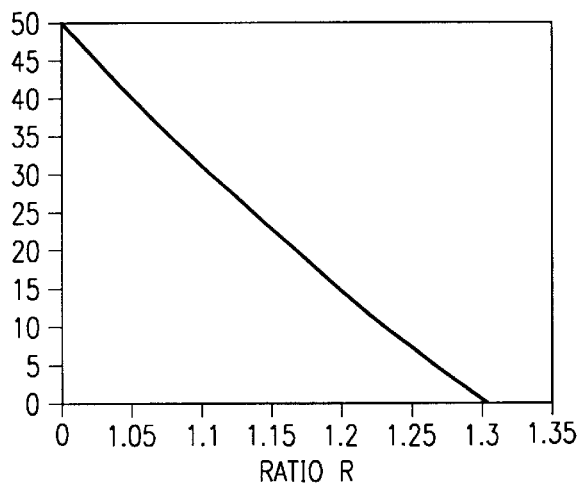
FIG. 19 illustrates sampling offset.

FIG. 19 illustrates the relationship between percent offset $P_o$ and the ratio $R$, which is the ratio between the two largest samples over a given period of the symbol-timing sinusoid. This ratio, $R$, is a strong indicator of sampling offset. In the case of R=1, the two samples are straddling the sinusoid's crest, and the offset is ½ of the sample period $1/F_s$ ($P_o$=50%). The ratio R reaches its maximum value:

$$R_{max} = \left(\cos\left(\frac{2\pi R_s}{F_s}\right)\right)^{-1}$$

when the offset is zero ($P_o$=0%). Given that the relationship between the sample offset shows a nearly linear dependence on the ratio R, the offset $P_o$ can be approximated as:

$$P_o \simeq 100(aR + b), \text{ where}$$

$$a = -b \cos\left(\frac{2\pi R_s}{F_s}\right), \text{ and}$$

$$b = \frac{0.5}{1 - \cos\left(\frac{2\pi R_s}{F_s}\right)}$$

Where U(n) denotes the equalizer output, simple linear interpolation can be used to construct the interpolated symbol $U_I(k)$:

$$U_I(k) = U(n_p) + \frac{P_o}{100} S$$

where S denotes normalized slope and is given by $$S = \begin{cases} U(n_p + 1) - U(n_p) c(n_p - 1) \leq c(n_p + 1) \\ U(n_p - 1) - U(n_p) c(n_p - 1) > c(n_p + 1) \end{cases}.$$

Carrier Recovery The recovered symbols are represented by the complex sequence U(k). If noise is neglected, then the U(k) values are estimates of the transmitted symbols $a_k$. An offset in the carrier frequency estimate will result in a rotation of the symbol constellation such that $U(k)=a_k e^{j(\omega \Delta T + \phi)}$, where frequency offset is $\omega_\Delta = \omega_c - \hat{\omega}_c$ and phase offset is $\phi$.

Figure 20A:
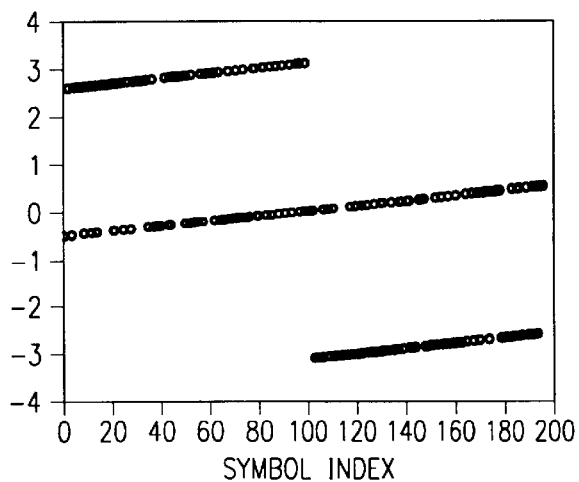
FIGS. 20A and 20B illustrate the phase of BSK symbols before and after squaring during carrier recovery.

FIG. 20A shows the phase of BPSK symbols for $\omega_\Delta = 2\pi$ radians per second $$T = \frac{1}{1200}.$$

The frequency offset is approximating by finding the slope of the lines traced by the symbols in FIG. 20A. The modulation can be removed by raising the symbols to an appropriate power as follows:

| modulation type | exponent M |
|---|---|
| BPSK | 2 |
| QPSK | 4 |
| 8-PSK | 8 |
| QAM-16 | 4 |
| QAM-32 | 8 |
| QAM-64 | 4 |

Figure 20B:
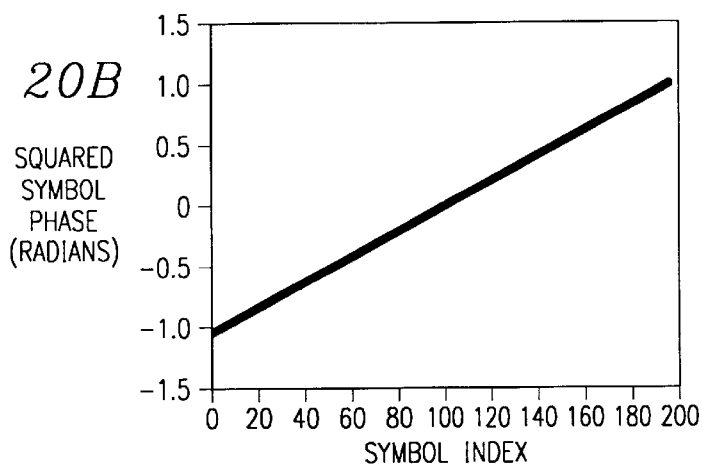

FIG. 20B shows the phase of the BPSK symbols after squaring. The modulation is clearly removed and the slope is doubled. The processing to estimate and remove the frequency offset $\omega_\Delta$ is described next.

Given a set of N symbols U(k), k=0, N−1, the modulation is removed by calculating $x(k)=U^M(k)$, where M is the appropriate exponent as set out above. Following the development of Burg's algorithm for autoregressive spectral estimation, the goal is to determine a prediction coefficient $a=a_r+ja_i$ that minimizes the power of the forward and backward prediction error:

$$\hat{p} = \frac{1}{2(N-1)} \sum_{k=1}^{N-1} \hat{e}_f(k) \hat{e}_f^*(k) + \hat{e}_b(k) \hat{e}_b^*(k), \text{ where}$$

$$\hat{e}_f(k) = x(k) + ax(k-1) \text{ and}$$

$$\hat{e}_b(k) = x(k-1) + ax(k)$$

where $$\hat{e}_f(k) = x(k) + ax(k-1)$$

and $$\hat{e}_b(k) = x(k-1) + ax(k)$$

Background for the algorithm is discussed in a book by S. M. Kay, entitled Modern Spectral Estimation (Prentice Hall 1988).

The above prediction error function is minimized by equating its gradient with zero and solving. With the gradient defined by $$\nabla(e_f(k)) = \frac{\partial e_f(k)}{\partial a_r} + \frac{\partial e_f(k)}{\partial a_i},$$

we observe that $$\nabla(e_f(k))=0$$

$$\nabla(e_f^*(k))=2x^*(k-1)$$

$$\nabla(e_b(k))=2x(k)$$

$$\nabla(e_f^*(k))=0$$

It follows that $$\nabla(\hat{p}) = \frac{1}{(N-1)} \sum_{k=1}^{N-1} a(x(k)x^*(k) + x(k-1)x^*(k-1)) + x(k)x^*(k-1)$$

Equating to zero and solving gives $$a = \frac{2\sum_{k=1}^{N-1} x(k)x^*(k-1)}{\sum_{k=1}^{N-1} x(k-1)x^*(k-1) + x(k)x^*(k)}$$

In practice, the denominator of the preceding equation is not calculated because it is a real-valued number and does not affect the phase of the prediction coefficient α. The frequency offset can be estimated by:

$$\hat{\omega}_\Delta = \frac{1}{2T} \arctan\left(\frac{a_i}{a_r}\right)$$

This estimate can be used to remove the frequency offset so that the constellation no longer rotates. Next, the phase offset $\phi$ can be estimated by:

$$\hat{\phi} = \sum_{k=0}^{N-1} x(k)e^{-j2\omega\Delta kT}$$

Phase Recovery Once synchronization with the carrier frequency is achieved, the carrier phase can be determined. There are various methods for this, including mode-based algorithms discussed in a publication by C. N. Georghiades, entitled "Blind Carrier Phase Acquisition for QAM Constellations", from *IEEE Trans. Communications*, Vol. 45, No. 11, November 1997. A simple fourth-power method may be used, where the phase error is calculated as follows:

$$\hat{\phi} = \frac{\arg\left\{\sum_k U(k)^4\right\}}{4}$$

Classification for PSK/QAM Signals; Hypothesis Testing Details

In the following discussion, a maximum likelihood technique is based on a simple approximation of the underlying probability density functions (PDFs). The technique does not require knowledge of carrier phase and is robust to errors in carrier frequency. In addition, it includes both PSK and QAM signals up to 64 levels.

Each signal-of-interest (SOI) is identified as either BPSK, QPSK, 8-PSK, QAM-6, QAM-32, or QAM-64 with a given level of confidence for each. If the carrier frequency and noise variance are known, this amounts to a simple hypotheses test, which is such that the probability density function governing the data under each specified hypothesis is entirely unknown. However, these parameters are most often unknown and as a result the classification process requires composite hypothesis testing. Estimates of the unknown parameters are used to reduce the composite problem to one that is simple.

The symbols acquired from the above-described demodulation process can be represented by:

$$U(k)=A(k)e^{j\phi(k)}e^{\omega\Delta k}e^{\psi}+n(k)$$

where $\omega\Delta$ is a (usually small) frequency offset, $\psi$ is a phase offset, and the transmitted symbol with amplitude $A(k)$ and phase $\phi(k)$ has been corrupted by additive noise $n(k)=A_n(k)e^{\phi_n(k)}$. It is assumed that $n(k)$ is an uncorrelated Gaussian noise sequence with zero mean and variance $\eta_o$.

Let $\{m_o, m_1, m_2, m_3, m_4, m_5\}$ denote the event that the intercepted signal is of modulation type BPSK, QPSK, 8-PSK, QAM-16, QAM-32, or QAM-64, respectively. Let $P[m=m_i]$ denote the a priori probability of the event $m_i$. Because the PDF function depends on the unknown random parameters $\eta_o$, and $\omega\Delta$, a composite hypothesis test based on Bayes criterion gives a general solution. In this case, the optimum classifier, on observing the vector $U$ $[U(0)\ U(1)\ \ldots\ U(N-1)]^T$, sets $m=m_k$ whenever $$c_i P[m_i]E[p_U(\rho|m=m_i,\eta,\omega\Delta,\psi)]$$

is maximum for $i=k$, where $c_i$ depends on the Bayes cost criterion. Unfortunately, this solution is highly computational. The dependence on $\eta_0$ can be removed by estimating its value from the measured signal spectrum. The dependence on the remaining parameters, $\omega\Delta$ and $\psi$, can be circumvented by working with the phase differences between symbols, which is described next.

Given a collection of N symbols, the classifier observes the N−1 vector r, constructed from amplitudes and phase differences of the symbols:

$$r = \begin{bmatrix} r(0) \\ r(1) \\ \vdots \\ r(N-2) \end{bmatrix}$$

where $$r(k)=A_r(k)e^{\phi\Delta(k)}$$

and $$A_r(k)=A(k)+A_n(k)$$

$$\phi\Delta(k)=(\phi(k)-\phi(k-1))-\omega\Delta+(\phi_n(k)-\phi_n(k-1))$$

The amplitude $A_r(k)$ is composed of a signal component $A(k)$ and a noise component $A_n(k)$, and is characterized by a Ricean distribution, which is completely determined by the noise density $$\frac{\eta o}{2}.$$

For the range of SNR considered herein, the Ricean distribution is approximated by a Gaussian distribution.

The phase difference is also composed of a signal component $\phi(k)-\phi(k-1)$, and a noise component $\phi_n(k)-\phi_n(k-1)$, but it also includes a component due to frequency error $\omega\Delta$. For the SNRs under consideration, the probability density function governing the noise component $\phi_n(k)-\phi_n(k-1)$ is approximately a Gaussian distribution with zero mean and variance $$\frac{\eta o}{2}.$$

Further, it has been found that the frequency offset can be made sufficiently small that an can be ignored.

Using these estimated parameters to define the conditional density function $p_r(\rho|m=m_i)$, the following maximum likelihood test is defined. On observing r, then $m=m_k$ whenever $$P[m_i]p_r(\rho|m=m_i)$$

is maximum for $i=k$. In the case where the $m_i$ have equal likelihood, the a priori probability $P[m_i]$ is dropped from the above expression. The analysis may be further simplified by approximating the joint density function by the product of the individual density functions such that:

$$p_r(\rho|m=m_i) \approx p_{Ar}(\rho|m=m_i)p_{\phi\Delta}(\rho|m=m_i)$$

The density functions governing each hypothesis are approximated by weighted sums of Gaussians. For example in the case of BPSK ($m=m_o$), the individual density functions are given by:

$$P_{A_r(k)}(\rho|m=m_0) = \frac{1}{\sqrt{2\pi}\,\sigma}e^{-\frac{(\rho-\mu_A)^2}{2\sigma^2}}$$

$$P_{\phi\Delta(k)}(\rho|m=m_0) = \frac{1}{4\sqrt{\pi}\,\sigma}e^{-\frac{(\rho-0)^2}{4\sigma^2}} + \frac{1}{4\sqrt{\pi}\,\sigma}e^{-\frac{(\rho-\phi)^2}{4\sigma^2}}$$

where it is assumed that the symbol rate is approximately twice the signal bandwidth ($R_s=2W$), such that $$\sigma^2 = \frac{\eta o}{2} = \frac{1}{SNR}.$$

The phase density function is a Gaussian with variance $2\sigma^2$. The factor of two results anytime the sum or difference of two or more independent random variables is taken.

Figure 21A:
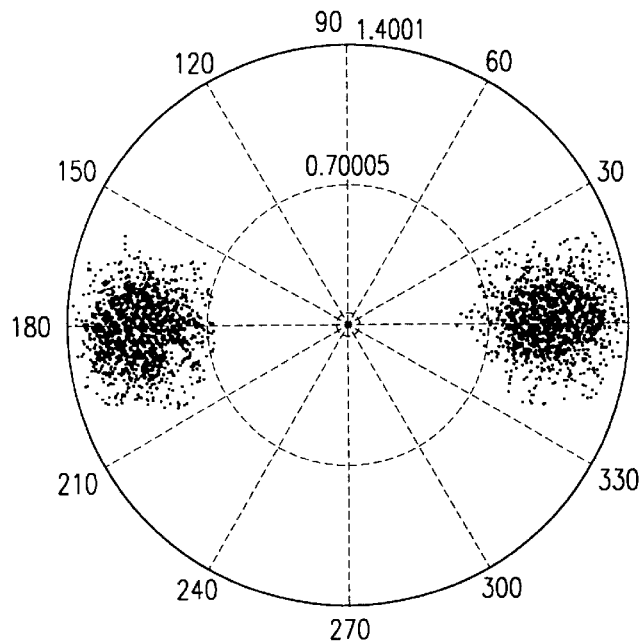
FIGS. 21A–21C illustrate approximate probability density functions for a BSK signal, at 15 dB SNR, where
Figure 21B:
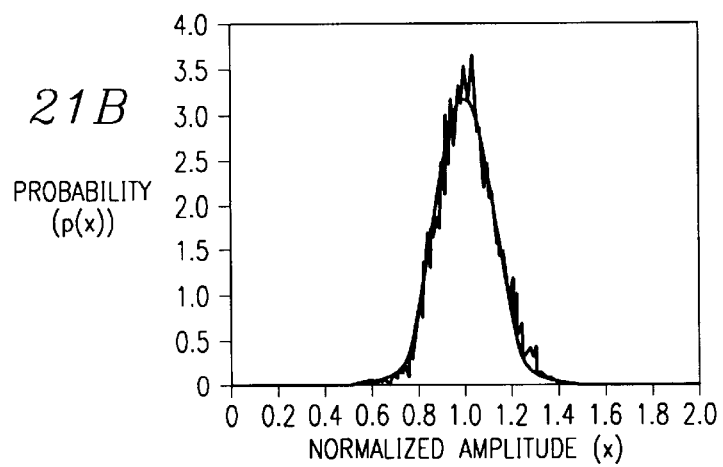
Figure 21C:
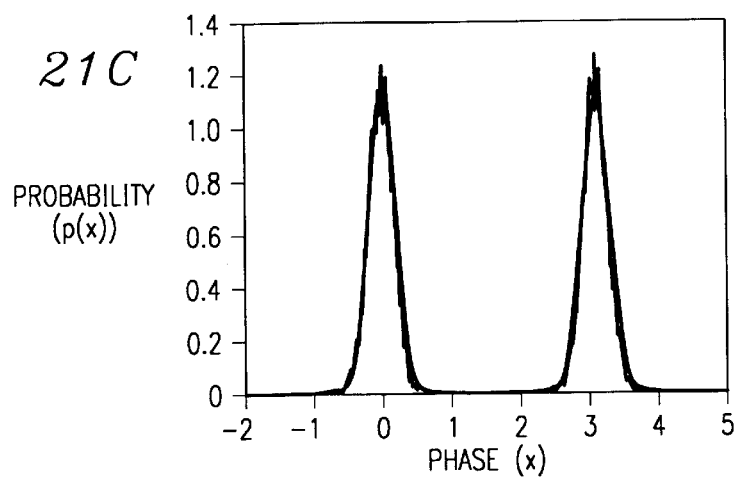
Figure 22A:
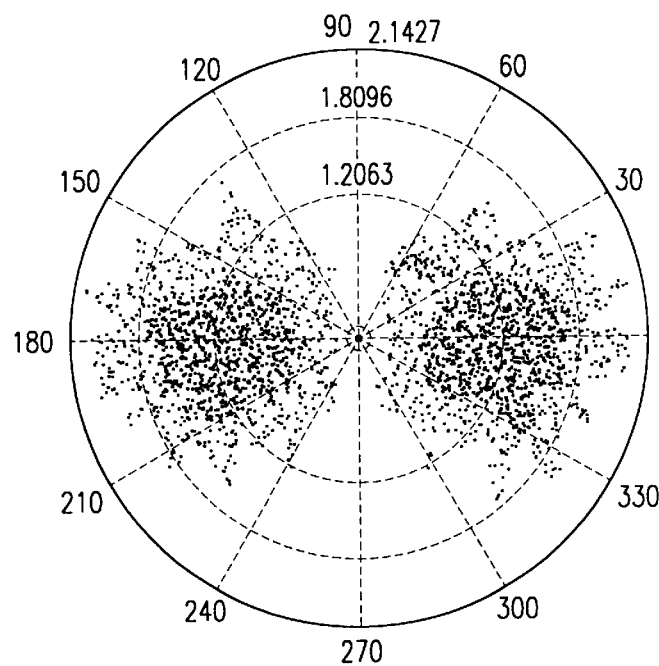
FIGS. 22A–22C illustrate approximate probability density functions for a BSK signal, at 5 dB SNR, where
Figure 22B:
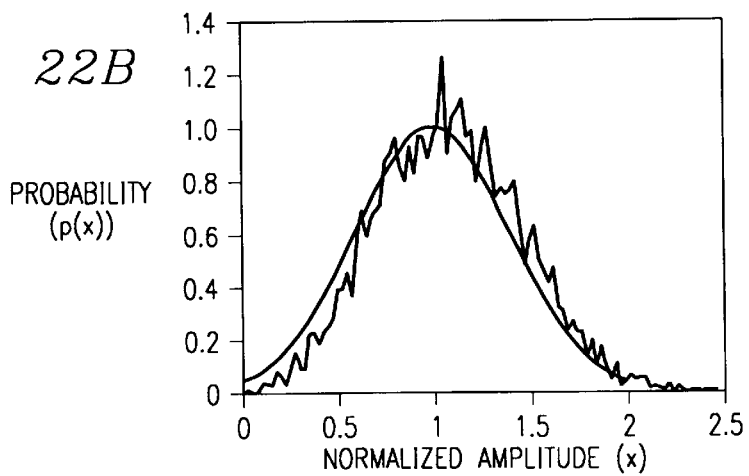
Figure 22C:
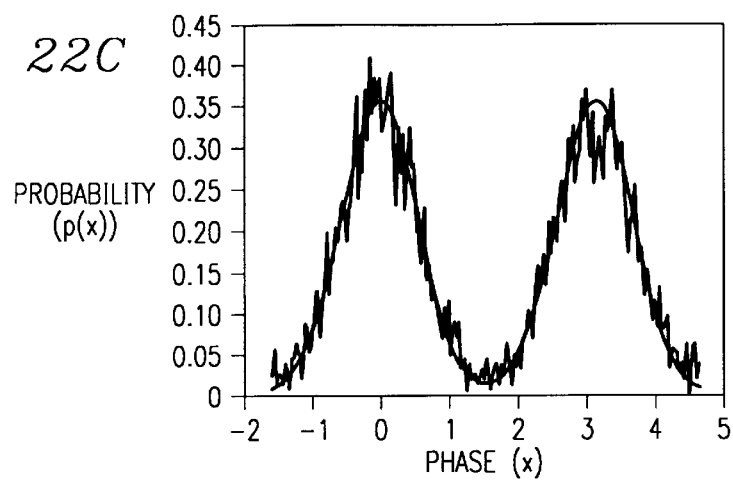

FIGS. 21A–21C and 22A–22C illustrate approximate PDFs for a BPSK signal, plotted against simulated data, for 15 and 5 dB SNR respectively. FIGS. 21A and 22A are datagrams, FIGS. 21B and 22B show amplitude, and FIGS. 21C and 22C show phase. Comparing these FIGUREs shows a close correspondence between the approximate PDFs proposed and the simulated data, which justifies the Gaussian approximation. In particular, FIGS. 22A–22C show that the approximations are reasonably accurate down to 5 dB SNR, which is near the minimum level at which BPSK communication can be sustained. FIGS. 21A–21C show that the approximate PDFs become more accurate as SNR increases. The actual PDF governing the amplitude data is Ricean, and at low SNR levels, it is better approximated by a Rayleigh distribution than a Gaussian. This is evident from the skewing of the simulated data in FIGS. 22A–22C, due to the fact that the amplitude data has only positive values.

Figure 23A:
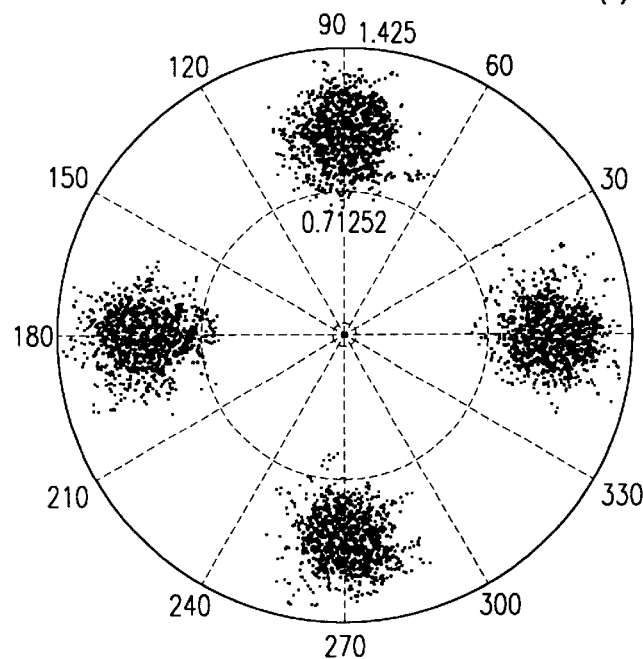
FIGS. 23A–23C illustrate approximate probability density functions for a QPSK signal, at 15 dB SNR, where
Figure 23B:
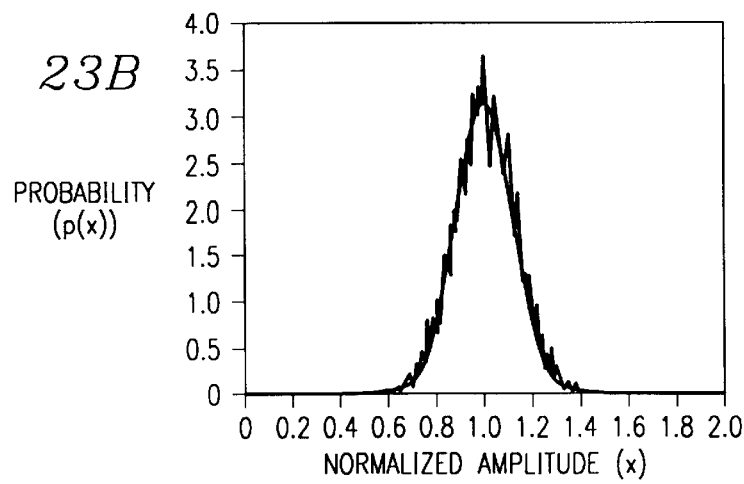
Figure 23C:
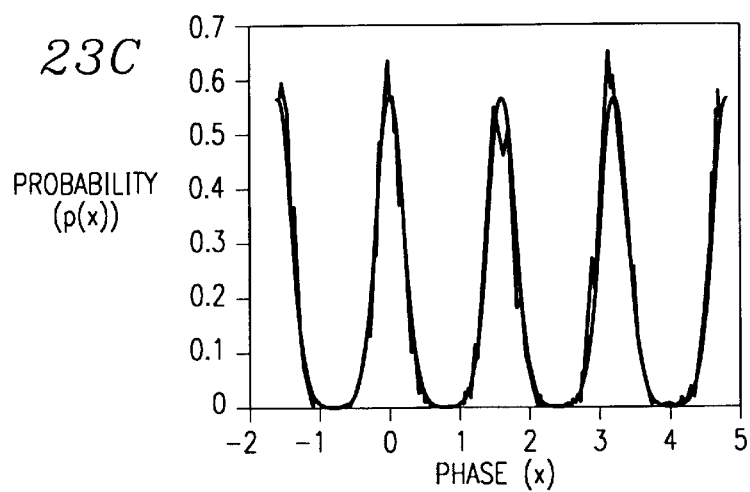

FIGS. 23A–23C show the PDF approximations for a QPSK signal at 15 dB SNR. The phase PDF for the QPSK signal includes two additional Gaussians centered at $$\pm \frac{\pi}{2},$$

which permits QPSK to be easily discriminated from BPSK using the maximum likelihood test described above.

Figure 24A:
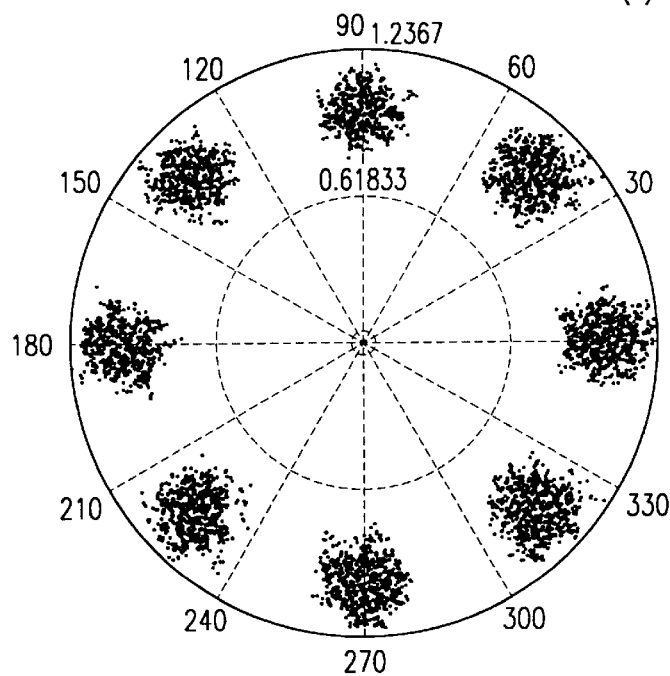
FIGS. 24A–24C illustrate approximate probability density functions for a PSK-8 signal, at 20 dB SNR, where
Figure 24B:
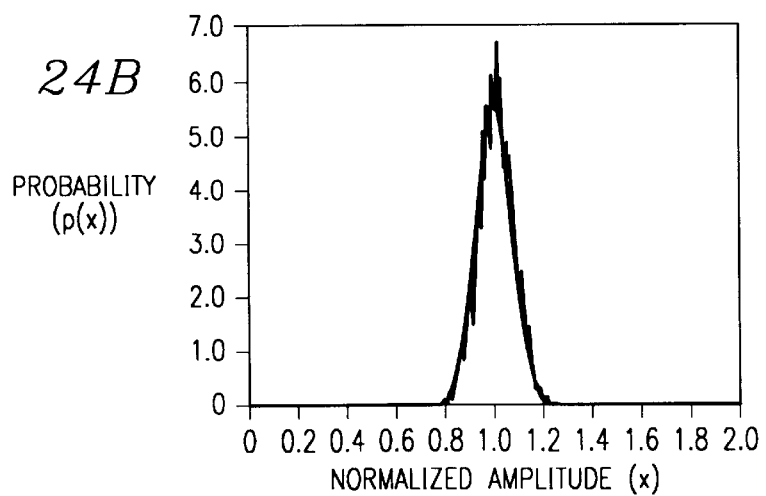
Figure 24C:
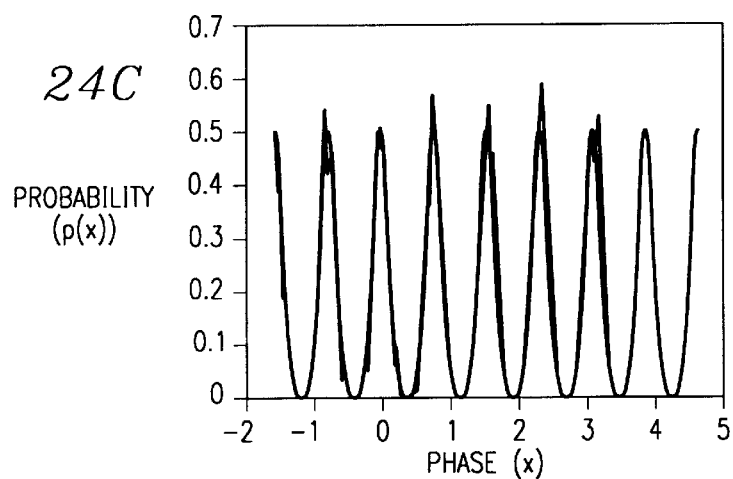

FIGS. 24A–24C show the PDF approximations for a PSK-8 signal at 20 dB SNR. The phase PDF for the PSK-8 signal includes eight Gaussians; four more than QPSK, and six more than BPSK.

Figure 25A:
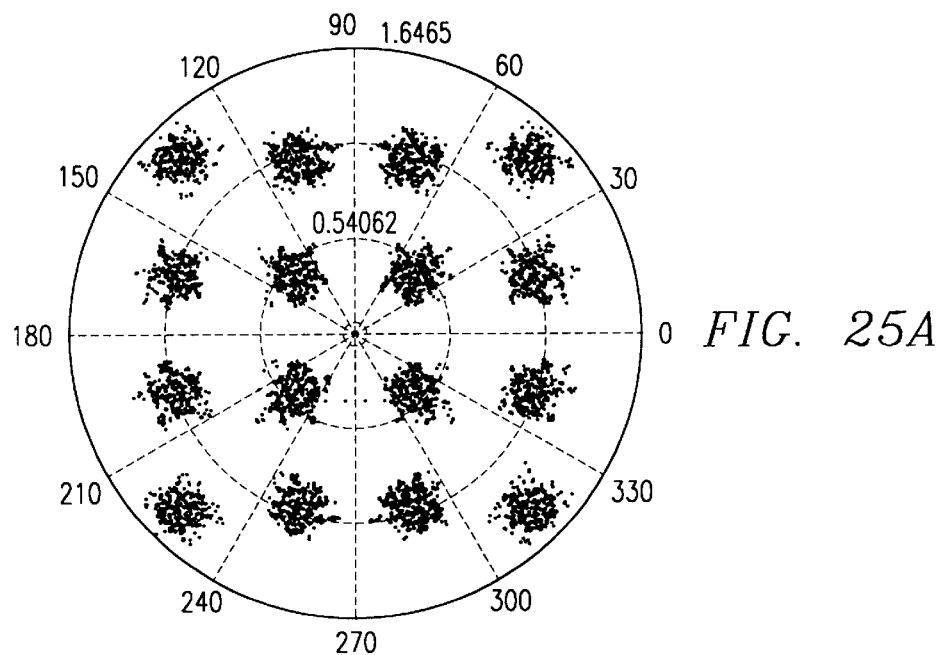
FIGS. 25A–25C illustrate approximate probability density functions for a QAM-16 signal, at 20 dB SNR, where
Figure 25B:
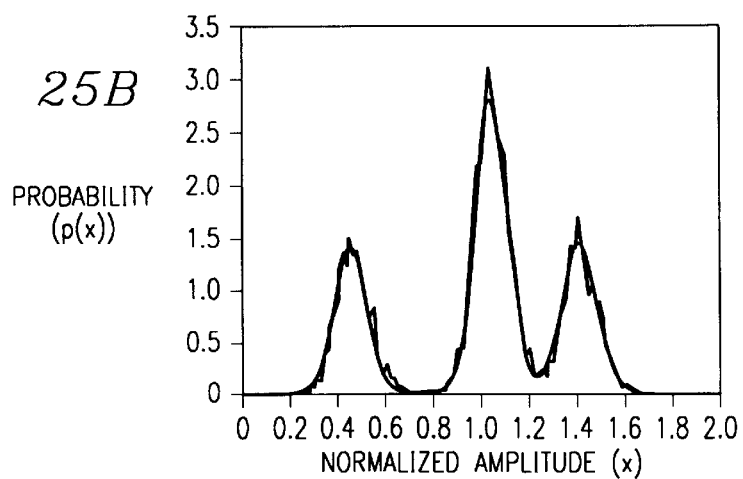
Figure 25C:
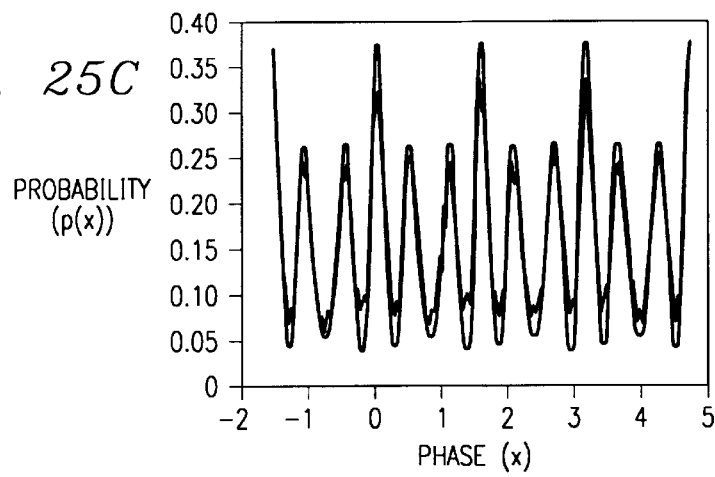

FIGS. 25A–25C show the PDF approximations for a QAM-16 signal at 20 dB SNR. The amplitude PDF for the QAM signal includes three Gaussians centered at $$\frac{\sqrt{2}}{3}, \frac{\sqrt{10}}{3}, \text{ and } \frac{\sqrt{18}}{3},$$

which permits a QAM-16 signal to be easily discriminated from a PSK signal using the maximum likelihood test described above.

Figure 26A:
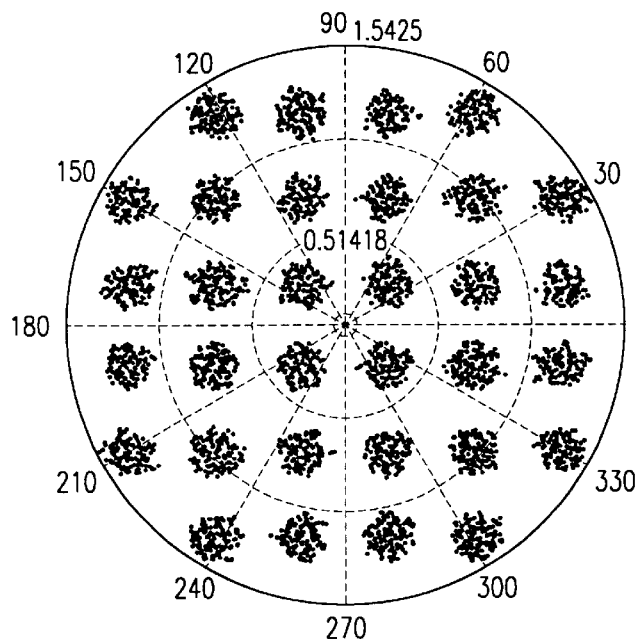
FIGS. 26A–26C illustrate approximate probability density functions for a QAM-32 signal, at 25 dB SNR, where
Figure 26B:
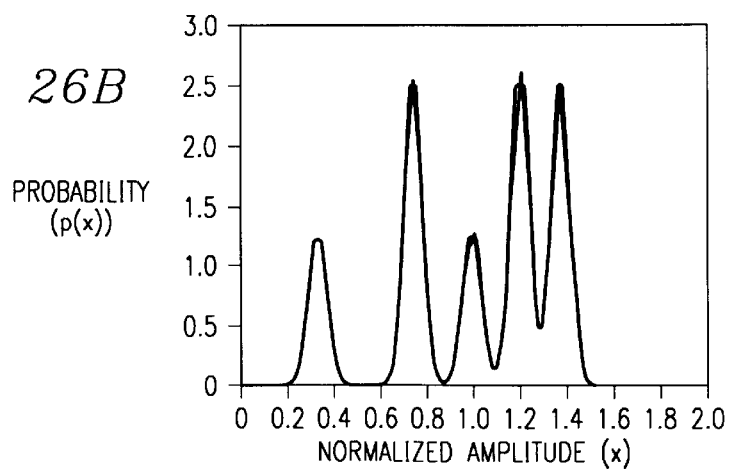
Figure 26C:
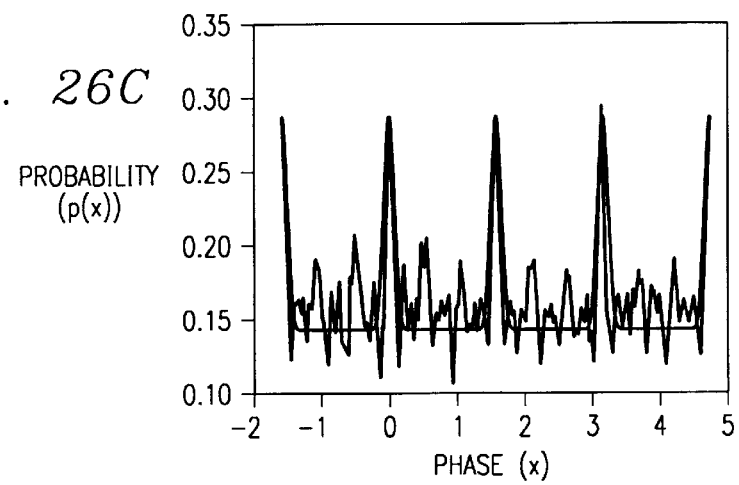

FIGS. 26A–26C show the PDF approximations for a QAM-32 signal at 25 dB SNR. The amplitude PDF for the QAM signal includes five Gaussians centered at $$\frac{\sqrt{2}}{4.23}, \frac{\sqrt{10}}{4.23}, \frac{\sqrt{18}}{4.23}, \frac{\sqrt{26}}{4.23}, \text{ and } \frac{\sqrt{34}}{4.23}.$$

The phase PDF for QAM-32 includes a large number of Gaussians, which makes it approximately uniformly distributed at low SNR. The approximation of the phase PDF is simplified by using a uniformly distributed PDF with four Gaussians.

Figure 27A:
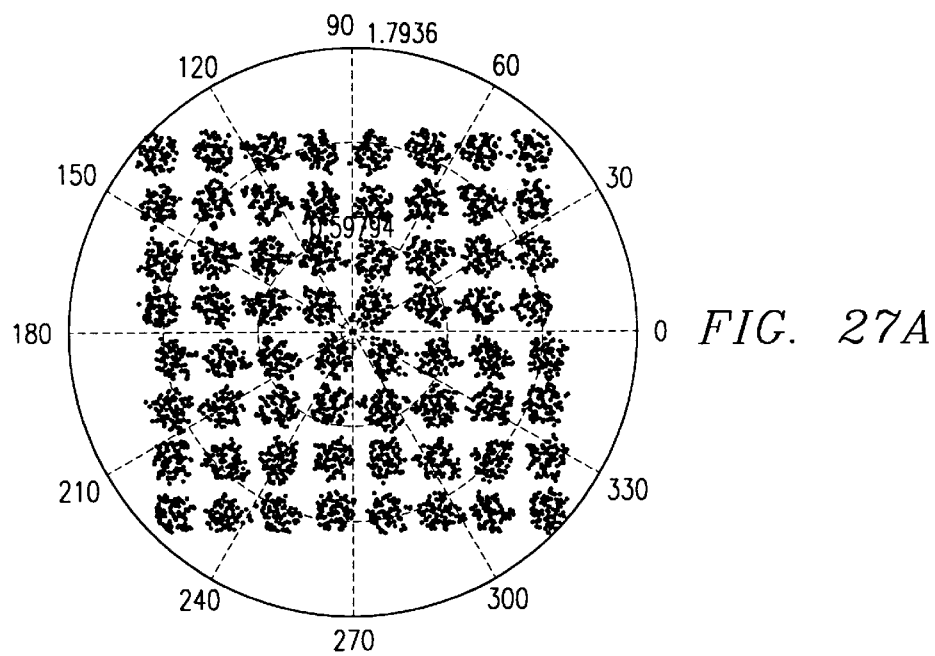
FIGS. 27A–27C illustrate approximate probability density functions for a QAM-64 signal, at 25 dB SNR, where
Figure 27B:
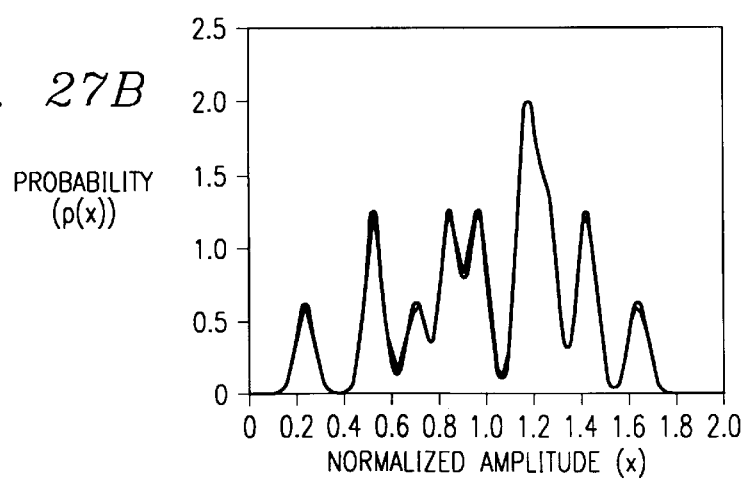
Figure 27C:
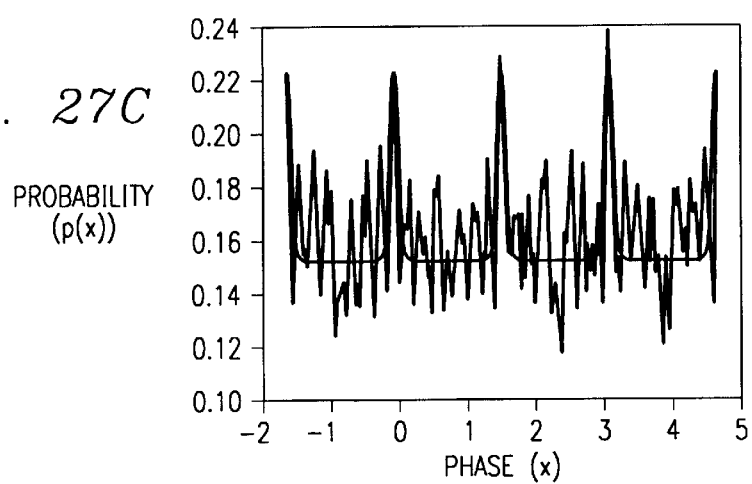

FIGS. 27A–27C show the PDF approximations for a QAM-64 signal at 25 dB SNR. The amplitude PDF for the QAM signal includes nine Gaussians centered at $$\frac{\sqrt{2}}{6.09}, \frac{\sqrt{10}}{6.09}, \frac{\sqrt{18}}{6.09}, \frac{\sqrt{26}}{6.09}, \frac{\sqrt{34}}{6.09},$$

$$\frac{\sqrt{50}}{6.09}, \frac{\sqrt{58}}{6.09}, \frac{\sqrt{74}}{6.09}, \text{ and } \frac{\sqrt{98}}{6.09}$$

"Likelihood ratios" are calculated by substituting data in PDFs. For example, for random variables x and y, PDFs might be Px(x) and Py(y). For a realization z of a random variable that could be x or y, the likelihood ratio is Px(z)/Py(z). If the ratio is greater than 1, then z is a realization of x. If the ratio is less than 1, then z is a realization of y.

An important parameter in the design of PSK/QAM module 24 is the number of symbols that are used to make a decision. Using a large number of symbols reduces the probability of effort and probability of false alarm. However, increasing the number of symbols increases latency. Also, many signals of interest are short in duration, which limits the number of symbols that can be used.

Figure 28A:
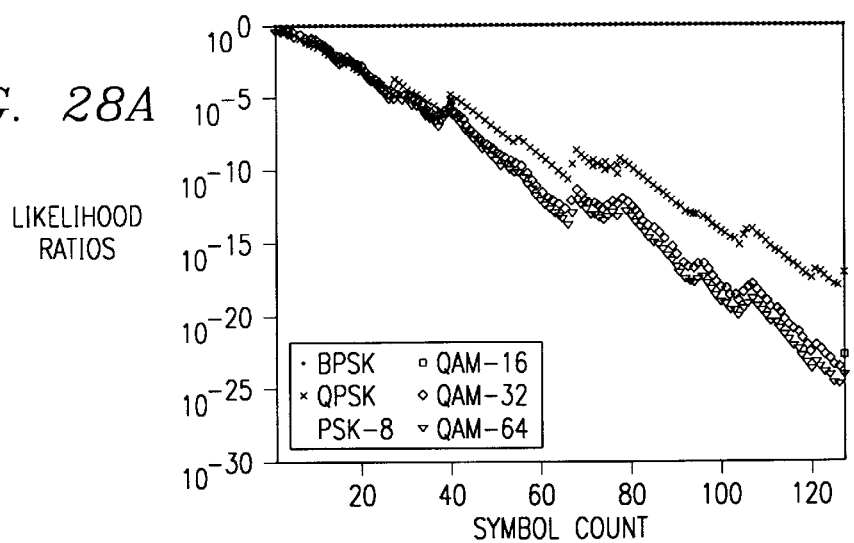
FIG. 28A illustrates the likelihood ratio for a BPSK signal at 5 dB SNR.
Figure 28B:
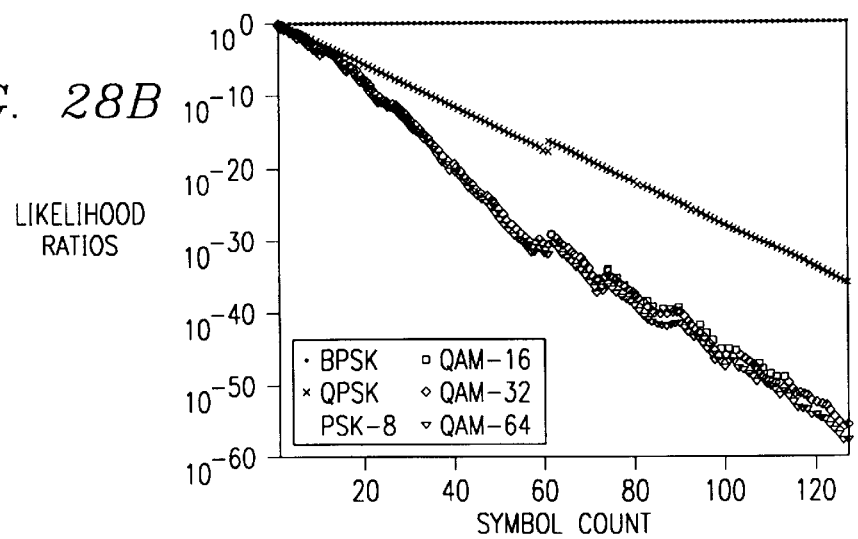
FIG. 28B illustrates the likelihood ratio for a BPSK signal at 10 dB SNR.

FIGS. 28A and 28B illustrate likelihood ratios as a function of symbol count for a BPSK signal at 5 and 10 dB SNR, respectively. As the SNR increases, the margin (probability of correct decision) between the likelihood ratios increases. That is, as the SNR increases, fewer symbols are needed to achieve a given margin between the correct signal and all the others. This trend is also exhibited for QPSK, PSK-8, QAM-16, QAM-32, and QAM-64.

Classification for PSK/QAM Signals; False Alarm Test Details

The classification process described above determines which PSK/QAM subclass best matches the received signal. However, if the signal is not one of these subclass types, the algorithm, as described so far, does not indicate a mismatch. As explained below, the algorithm may be augmented with a measure of fit that is used to reject non-PSK/QAM signals.

The decision between candidate PSK/QAM modulation types is based on the value of the likelihood function, namely $p_r(\rho|m=m_i)$, which is formed by calculating the candidate density function at the value of the measured amplitude and phase. Goodness of fit may be measured by comparing the expected value of the likelihood function with the mean value that is calculated from the data; that is, the mean of $p_r(\rho|m=m_k)$ is compared with the following:

$$E[p_r(\rho|m=m_k)]$$

for the winning candidate $m_k$.

A difficulty in using this approach is that at high SNR, the goodness of fit is highly dependent on the accuracy of the estimate for SNR. This difficulty may be countered by searching over a range of values on $$\frac{\eta o}{2}$$

centered on $$\frac{\hat{\eta} o}{2}$$

for the $$E\left[p_r\left(\rho \mid m = m_k, \frac{\eta o}{2}\right)\right]$$

that best matches the mean of $$p_r\left(\rho \mid m = m_i, \frac{\hat{\eta} o}{2}\right).$$

That is, the following calculation is made:

$$E\left[p_r\left(\rho \mid m = m_k, \frac{\eta o}{2}\right)\right] = \int_{-\infty}^{\infty} p_r\left(\rho \mid m = m_k, \frac{\eta o}{2}\right) p_r\left(\rho \mid m = m_k, \frac{\hat{\eta} o}{2}\right) d\rho$$

over a range of $$\frac{\eta o}{2}$$

to find the best match with the mean of $$p_r\left(\rho \mid m = m_k, \frac{\hat{\eta} o}{2}\right)$$

calculated from the measured data. This technique not only gives an indication for goodness of fit, but also gives a more refined estimate on SNR.

With $$\sigma_1 = \frac{\hat{\eta} o}{2} \text{ and } \sigma_2 = \frac{\hat{\eta} o}{2},$$

it can be somewhat tedious to calculate the expressions for $$E\left[p_r\left(\rho \mid m = m_k, \frac{\eta o}{2}\right)\right].$$

These expressions for each modulation subclass are as follows:

$$E\left[P_{\phi_\Delta}(k)\left(\rho \mid m = m_o, \frac{\eta o}{2}\right)\right] = \quad \text{BPSK}$$

$$\frac{1}{\sqrt{2\pi}\sqrt{\sigma_1^2 + \sigma_2^2}}\left(\frac{1}{2} + \frac{1}{2}e^{-\frac{\pi^2}{2(\sigma_1^2 + \sigma_2^2)}}\right)$$

$$E\left[P_{\phi_\Delta}(k)\left(\rho \mid m = m_1, \frac{\eta o}{2}\right)\right] = \quad \text{QPSK}$$

$$\frac{1}{\sqrt{2\pi}\sqrt{\sigma_1^2 + \sigma_2^2}}\left(\frac{1}{4} + \frac{1}{2}e^{-\frac{(\frac{\pi}{2})^2}{2(\sigma_1^2 + \sigma_2^2)}} + \frac{1}{4}e^{-\frac{\pi^2}{2(\sigma_1^2 + \sigma_2^2)}}\right)$$

$$E\left[P_{\phi_\Delta}(k)\left(\rho \mid m = m_2, \frac{\eta o}{2}\right)\right] = \quad \text{8-PSK}$$

$$\frac{1}{\sqrt{2\pi}\sqrt{\sigma_1^2 + \sigma_2^2}}\left(\frac{1}{8} + \frac{1}{4}e^{-\frac{(\frac{\pi}{4})^2}{2(\sigma_1^2 + \sigma_2^2)}} + \frac{1}{4}e^{-\frac{(\frac{\pi}{2})^2}{2(\sigma_1^2 + \sigma_2^2)}} + \frac{1}{4}e^{-\frac{(\frac{3\pi}{4})^2}{2(\sigma_1^2 + \sigma_2^2)}} + \frac{1}{8}e^{-\frac{\pi^2}{2(\sigma_1^2 + \sigma_2^2)}}\right)$$

$$E\left[P_{A_r}(k)\left(\rho \mid m = m_3, \frac{\eta o}{2}\right)\right] = \frac{1}{\sqrt{2\pi}\sqrt{\sigma_1^2 + \sigma_2^2}} \quad \text{QAM-16}$$

$$\left(\frac{3}{8} + \frac{1}{4}e^{-\frac{(u_1-u_2)^2}{2(\sigma_1^2+\sigma_2^2)}} + \frac{1}{4}e^{-\frac{(u_2-u_3)^2}{2(\sigma_1^2+\sigma_2^2)}} + \frac{1}{8}e^{-\frac{(u_1-u_3)^2}{2(\sigma_1^2+\sigma_2^2)}}\right)$$

where $u_1 = \frac{\sqrt{2}}{3}$, $u_2 = \frac{\sqrt{10}}{3}$, and $u_3 = \frac{\sqrt{18}}{3}$.

$$E\left[P_{A_r}(k)\left(\rho \mid m = m_3, \frac{\eta o}{2}\right)\right] = \quad \text{QAM-32}$$

$$\frac{1}{\sqrt{2\pi}\sqrt{\sigma_1^2+\sigma_2^2}}\left(\frac{7}{32} + \frac{1}{16}e^{-\frac{(u_1-u_2)^2}{2(\sigma_1^2+\sigma_2^2)}} + \frac{1}{16}e^{-\frac{(u_1-u_3)^2}{2(\sigma_1^2+\sigma_2^2)}} + \right.$$

$$\frac{1}{32}e^{-\frac{(u_1-u_4)^2}{2(\sigma_1^2+\sigma_2^2)}} + \frac{1}{16}e^{-\frac{(u_1-u_5)^2}{2(\sigma_1^2+\sigma_2^2)}} \frac{1}{8}e^{-\frac{(u_2-u_3)^2}{2(\sigma_1^2+\sigma_2^2)}} +$$

$$\frac{1}{16}e^{-\frac{(u_2-u_4)^2}{2(\sigma_1^2+\sigma_2^2)}} + \frac{1}{8}e^{-\frac{(u_2-u_5)^2}{2(\sigma_1^2+\sigma_2^2)}} +$$

$$\left.\frac{1}{16}e^{-\frac{(u_3-u_4)^2}{2(\sigma_1^2+\sigma_2^2)}} + \frac{1}{8}e^{-\frac{(u_3-u_5)^2}{2(\sigma_1^2+\sigma_2^2)}} + \frac{1}{16}e^{-\frac{(u_4-u_5)^2}{2(\sigma_1^2+\sigma_2^2)}}\right)$$

where $u_1 = \frac{\sqrt{2}}{4.23}$, $u_2 = \frac{\sqrt{10}}{4.23}$, $u_3 = \frac{\sqrt{18}}{4.23}$, $u_4 = \frac{\sqrt{26}}{4.23}$, $$u_5 = \frac{\sqrt{34}}{4.23}, u_6 = \frac{\sqrt{34}}{4.23}, u_7 = \frac{\sqrt{50}}{4.23}.$$

$$E\left[P_{A_r}(k)\left(\rho \mid m = m_3, \frac{\eta o}{2}\right)\right] = \frac{1}{\sqrt{2\pi}\sqrt{\sigma_1^2+\sigma_2^2}} \quad \text{QAM-64}$$

$$\left(\frac{32}{256} + \frac{1}{64}e(1,2) + \frac{1}{128}e(1,3) + \frac{1}{64}e(1,4) + \frac{1}{64}e(1,5) + \right.$$

$$\frac{3}{128}e(1,6) + \frac{1}{64}e(1,7) + \frac{e(1,8)}{64} + \frac{e(1,9)}{128} +$$

$$\frac{1}{64}e(2,3) + \frac{1}{32}e(2,4) + \frac{1}{32}e(2,5) + \frac{3}{64}e(2,6) +$$

$$\frac{1}{32}e(2,7) + \frac{1}{32}e(2,8) + \frac{1}{64}e(2,9) + \frac{1}{64}e(3,4) +$$

$$\frac{1}{64}e(3,5) + \frac{3}{128}e(3,6) + \frac{1}{64}e(3,7) + \frac{1}{64}e(3,8) +$$

$$\frac{1}{128}e(3,9) + \frac{1}{32}e(4,5) + \frac{4}{64}e(4,6) + \frac{1}{32}e(4,7) +$$

$$\frac{1}{32}e(4,8) + \frac{1}{64}e(4,9) + \frac{3}{64}e(5,6) + \frac{1}{32}e(5,7) +$$

$$\frac{1}{32}e(5,8) + \frac{1}{64}e(5,9) + \frac{3}{64}e(6,7) + \frac{3}{64}e(6,8) +$$

$$\left.\frac{3}{128}e(6,9) + \frac{1}{32}e(7,8) + \frac{1}{32}e(7,9) + \frac{1}{64}e(8,9)\right)$$

where $u_1 = \frac{\sqrt{2}}{6.09}$, $u_2 = \frac{\sqrt{10}}{6.09}$, $u_3 = \frac{\sqrt{18}}{6.09}$, $u_4 = \frac{\sqrt{26}}{6.09}$, $$u_5 = \frac{\sqrt{34}}{6.09}, u_6 = \frac{\sqrt{50}}{6.09}, u_7 = \frac{\sqrt{58}}{6.09}, u_8 = \frac{\sqrt{74}}{6.09},$$

$$u_9 = \frac{\sqrt{98}}{6.09}, \text{ and } e(i,k) = e^{-\frac{(u_1-u_k)^2}{2(\sigma_1^2+\sigma_2^2)}}$$

Classification for PSK/QAM Signals; Performance

The classification algorithm was tested using 1000 Monte Carlo simulations over a range of SNR from 6 dB to 20 dB.

Figure 29A:
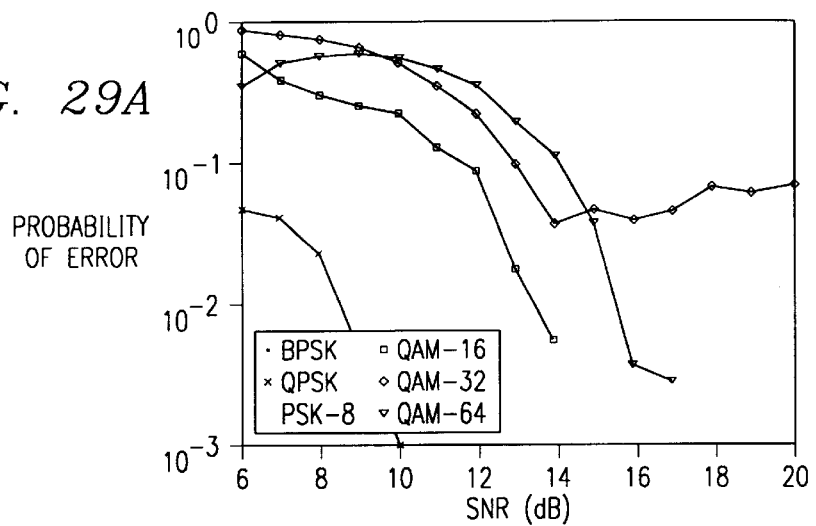
FIG. 29A illustrates error rates over repeated simulations, using 128 symbols for various PSK/QAM signals.
Figure 29B:
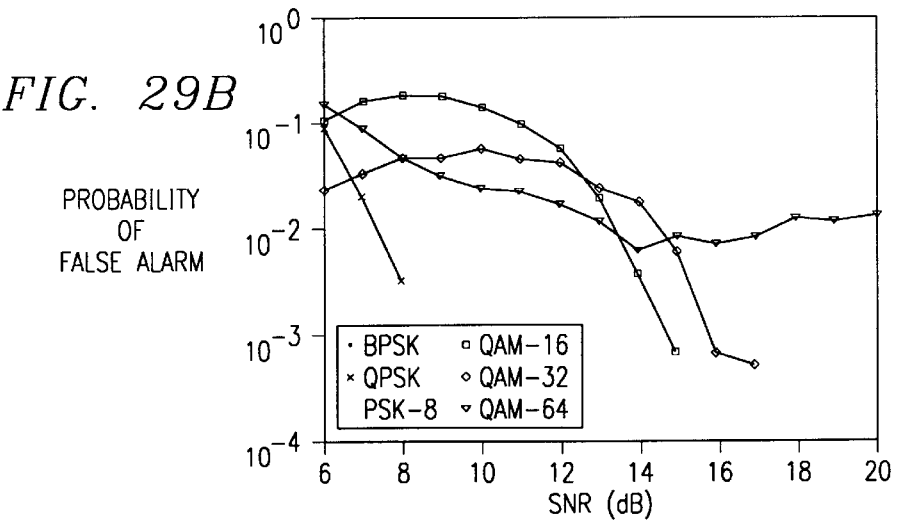
FIG. 29B illustrates false alarm rates over repeated simulations, using 128 symbols for various PSK/QAM signals.

FIGS. 29A and 29B show the resulting error rates and false alarm rates, using 128 symbols. The performance curves show general trend of improved performance at higher SNR. The error rate for BPSK is less than 10E-3 and that for QPSK is less than 1E-1 over this range. PSK-8 exhibits very good error rates as well. The recognizer requires 13 dB or better to achieve a 1E-1 error rate with QAM-16, and even higher for QAM-32 and QAM-64. The performance for QAM-32 levels off at high SNR revealing an error-rate performance floor that cannot be overcome without using more symbols in the recognition decision.

Figure 30A:
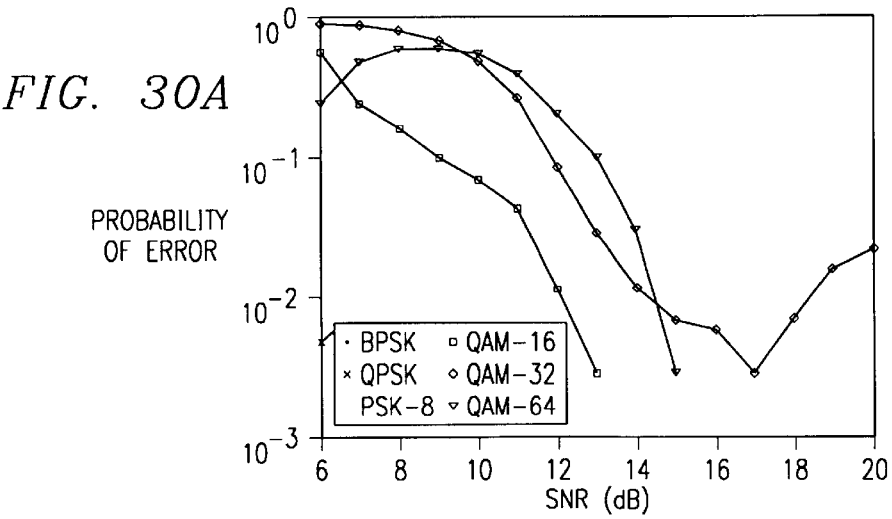
FIG. 30A illustrates error rates over repeated simulations, using 256 symbols for various PSK/QAM signals.
Figure 30B:
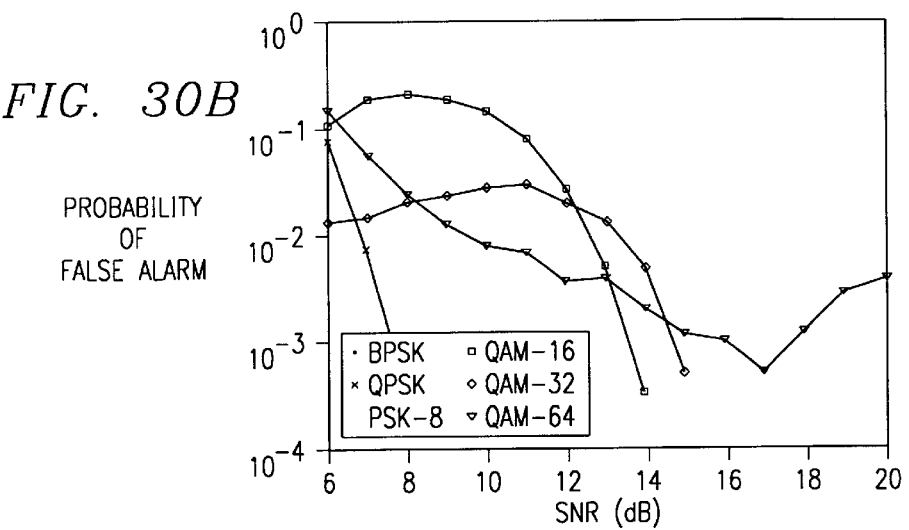
FIG. 30B illustrates false alarm rates over repeated simulations, using 256 symbols for various PSK/QAM signals.

FIGS. 30A and 30B shows the recognition performance using 256 symbols per recognition. Using twice the number of symbols, the error rate floor for QAM-32 has dropped significantly compared to FIGS. 29A and 29B. In all cases, the algorithm achieves error rates and false alarm rates below one in ten for SNR above 15 dB.

Applications of the Invention

Signal recognition can be used in a wideband system to steer narrowband resource allocation. It can also support a mission such as DF confirmation, monitoring, spectrum management, electronic surveillance, or interference identification.

Figure 31:
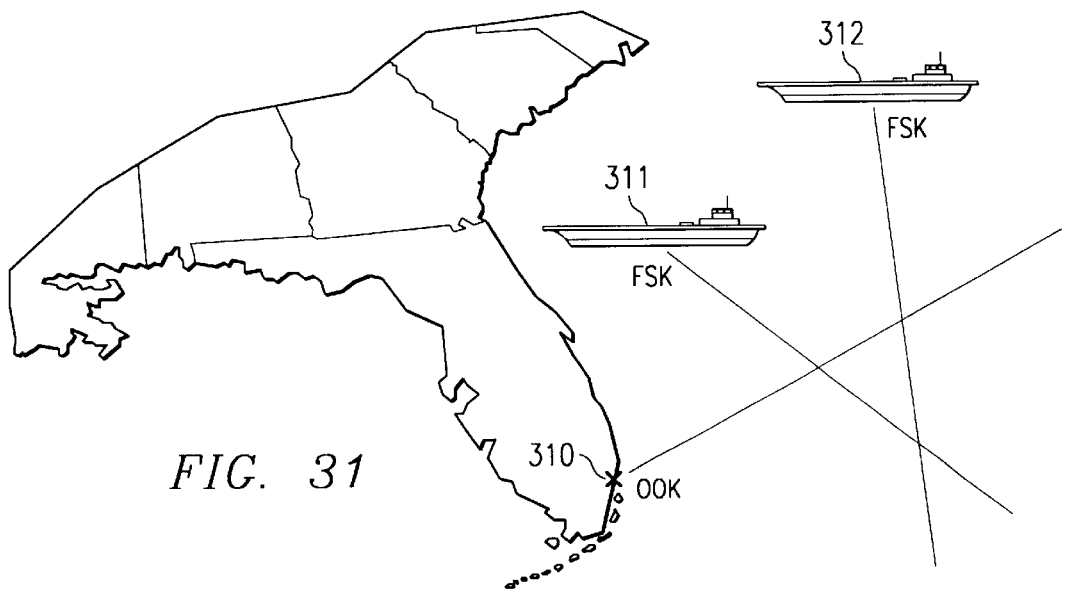
FIG. 31 illustrates an example of one application of the invention, in the field of direction finding confirmation.

FIG. 31 illustrates an example of one application of the invention, in the field of direction finding confirmation. As illustrated, a land site 310 and each of two ships 311 and 312 at sea have each picked up a signal and obtained a bearing. The result is two possible signal source locations. By using the techniques of the present invention, the signal can be identified to differentiate between signal sources. For example, the two ships might identify the signal as an FSK signal whereas the land site might identify the signal as a OOK signal. As a result, the correct location of the FSK source can be determined. As a further example, if all three receivers detected FSK signals, signal parameters could be detected and used to differentiate between signals.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A computer-implemented signal recognizer for classifying noncooperative signals, comprising:
    an up/down detector for detecting the presence of a noncooperative signal of interest;
    a signal classifier having a number of classifier modules, each module associated with a different signal modulation type and each module operable to perform the following tasks: to receive said signal of interest in digital form, to estimate at least one parameter of said signal of interest, to demodulate said signal of interest based on the estimated parameter, to determine a candidate signal type having the estimated parameter, and to calculate confidence data representing the extent to which said signal of interest is likely of said candidate signal type versus not of that signal type; and
    a confidence analyzer for receiving said confidence data from each said module and for determining a best signal type from the candidate signal types determined by said modules.

2. The recognizer of claim 1, wherein said candidate signal type has a parameter having a finite number of possibilities, each associated with one of a number of hypotheses, and wherein said signal classifier determines said candidate signal type by reducing said hypotheses to a single hypothesis on the basis of at least one estimated parameter.

3. The recognizer of claim 2, wherein said signal of interest is a PSK/QAM signal and said hypotheses represent PSK/QAM configurations.

4. The recognizer of claim 2, wherein said signal of interest is an FSK signal and said hypotheses represent signal levels.

5. The recognizer of claim 2, wherein said signal of interest is an analog signal and said hypothesis represent analog signal types.

6. The recognizer of claim 1, wherein said signal of interest is an MSK signal and wherein an estimated parameter is baud rate.

7. The recognizer of claim 1, wherein said signal of interest is an MSK signal and wherein an estimated parameter is frequency.

8. The recognizer of claim 1, wherein said signal of interest is an OOK signal and wherein an estimated parameter is words per minute.

9. The recognizer of claim 1, wherein said signal of interest is an OOK signal and wherein an estimated parameter is frequency.

10. The recognizer of claim 1, wherein said signal of interest is an OOK signal and wherein an estimated parameter is bandwidth.

11. The recognizer of claim 1, wherein said signal of interest is an FSK signal and wherein an estimated parameter is tone frequency.

12. The recognizer of claim 1, wherein said signal of interest is a PSK/QAM signal and wherein an estimated parameter is signal to noise ratio.

13. The recognizer of claim 1, wherein said signal of interest is an analog signal and wherein an estimated parameter is center frequency.

14. The recognizer of claim 2, wherein said signal classifier determines said candidate signal type by calculating probability density functions for each hypothesis.

15. The recognizer of claim 1, wherein said signal classifier demodulates said signal of interest using an adaptive equalization process.

16. The recognizer of claim 1, wherein said signal classifier demodulates said signal of interest using matched filtering techniques.

17. The recognizer of claim 1, wherein said signal classifier demodulates said signal of interest using a symbol timing recovery process based on squaring said signal of interest and filtering with a narrow bandpass filter.

18. The recognizer of claim 1, wherein said signal classifier demodulates said signal of interest using an interpolation process operable to mitigate interference from noncoherent sampling.

19. The recognizer of claim 1, wherein said signal classifier demodulates said signal of interest using a carrier recovery process based on principle component analysis.

20. The recognizer of claim 1, further comprising the step of using said candidate signal type as the basis for additional parameter estimation calculations.

21. A method of classifying noncooperative signals, comprising:
    detecting the presence of a noncooperative signal of interest;
    processing said signal of interest with a number of signal classifier modules, each module associated with a different signal modulation type and each module operable to perform the following tasks: to receive said signal of interest in digital form, to estimate at least one parameter of said signal of interest, to demodulate said signal of interest based on the estimated parameter, to determine a candidate signal type having the estimated parameter, and to calculate confidence data representing the extent to which said signal of interest is likely of said candidate signal type versus not of that signal type; and receiving said confidence data from each said module and determining a best signal type from the candidate signal types determined by said modules.

22. The method of claim 21, wherein said candidate signal type has a parameter having a finite number of possibilities, each associated with one of a number of hypotheses, and wherein said signal classifier determines said candidate signal type by reducing said hypotheses to a single hypothesis on the basis of at least one estimated parameter.

23. The method of claim 22, wherein said signal of interest is a PSK/QAM signal and said hypotheses represent PSK/QAM configurations.

24. The method of claim 22, wherein said signal of interest is an FSK signal and said hypotheses represent signal levels.

25. The method of claim 22, wherein said signal of interest is an analog signal and said hypothesis represent analog signal types.

26. The method of claim 21, wherein said signal of interest is an MSK signal and wherein an estimated parameter is baud rate.

27. The method of claim 21, wherein said signal of interest is an MSK signal and wherein an estimated parameter is frequency.

28. The method of claim 21, wherein said signal of interest is an OOK signal and wherein an estimated parameter is words per minute.

29. The method of claim 21, wherein said signal of interest is an OOK signal and wherein an estimated parameter is frequency.

30. The method of claim 21, wherein said signal of interest is an OOK signal and wherein an estimated parameter is bandwidth.

31. The method of claim 21, wherein said signal of interest is an FSK signal and wherein an estimated parameter is tone frequency.

32. The method of claim 21, wherein said signal of interest is a PSK/QAM signal and wherein an estimated parameter is signal to noise ratio.

33. The method of claim 21, wherein said signal of interest is an analog signal and wherein an estimated parameter is center frequency.

34. The method of claim 22, wherein said each said module determines said candidate signal type by calculating probability density functions for each hypothesis.

35. The method of claim 21, wherein each said module demodulates said signal of interest using an adaptive equalization process.

36. The method of claim 21, wherein each said module demodulates said signal of interest using matched filtering techniques.

37. The method of claim 20, wherein each said module demodulates said signal of interest using a symbol timing recovery process based on squaring said signal of interest and filtering with a narrow bandpass filter.

38. The method of claim 20, wherein each said module demodulates said signal of interest using an interpolation process operable to mitigate interference from noncoherent sampling.

39. The method of claim 20, further comprising the step of using said candidate signal type as the basis for additional parameter estimation calculations.

* * * * *